(12) United States Patent
Takano

(10) Patent No.: US 10,827,497 B2
(45) Date of Patent: *Nov. 3, 2020

(54) APPARATUS AND METHOD FOR BEAM SELECTION IN DOWNLINK TRANSMISSION

(71) Applicant: SONY CORPORATION, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/594,370

(22) Filed: Oct. 7, 2019

(65) Prior Publication Data
US 2020/0037302 A1 Jan. 30, 2020

Related U.S. Application Data

(63) Continuation of application No. 15/761,589, filed as application No. PCT/JP2016/070325 on Jul. 8, 2016, now Pat. No. 10,448,403.

(30) Foreign Application Priority Data

Oct. 6, 2015 (JP) .................................. 2015-198343

(51) Int. Cl.
*H04W 72/04* (2009.01)
*H04W 24/10* (2009.01)
(Continued)

(52) U.S. Cl.
CPC .......... *H04W 72/046* (2013.01); *H04J 11/00* (2013.01); *H04W 16/28* (2013.01); *H04W 24/10* (2013.01);
(Continued)

(58) Field of Classification Search
CPC ............. H04W 72/046; H04W 72/048; H04W 72/042; H04W 72/0413; H04W 52/16;
(Continued)

(56) References Cited

U.S. PATENT DOCUMENTS 10,448,403 B2 * 10/2019 Takano ............... H04W 72/048
2005/0153657 A1 7/2005 Maruta
(Continued)

FOREIGN PATENT DOCUMENTS

| CN | 1656711 A | 8/2005 |
|---|---|---|
| CN | 103069896 A | 4/2013 |

(Continued)

OTHER PUBLICATIONS

Non-Final Office Action for U.S. Appl. No. 15/761,589, dated Jan. 18, 2019, 12 pages.
(Continued)

*Primary Examiner* — Kenneth T Lam
(74) *Attorney, Agent, or Firm* — Chip Law Group

(57) ABSTRACT

An apparatus including an acquisition unit that acquires setting information from a base station, and a selection support unit that transmit an uplink reference signal to be used for selecting a beam to be used by the base station in downlink transmission using at least one first unit frequency band of a group including a plurality of unit frequency bands indicated by the setting information.

20 Claims, 16 Drawing Sheets

(51) Int. Cl.
*H04W 16/28* (2009.01)
*H04J 11/00* (2006.01)
*H04W 52/16* (2009.01)
*H04L 5/00* (2006.01)

(52) U.S. Cl.
CPC ......... *H04W 52/16* (2013.01); *H04W 72/042* (2013.01); *H04W 72/048* (2013.01); *H04W 72/0413* (2013.01); *H04L 5/001* (2013.01)

(58) Field of Classification Search
CPC ..... H04W 72/08; H04W 72/04; H04W 24/10; H04W 16/28; H04J 11/00; H04L 5/001
See application file for complete search history.

(56) References Cited

U.S. PATENT DOCUMENTS

| | | |
|---|---|---|
| 2010/0310000 A1 | 12/2010 | Ko et al. |
| 2011/0038436 A1 | 2/2011 | Kim et al. |
| 2012/0044906 A1 | 2/2012 | Chen et al. |
| 2012/0069795 A1 | 3/2012 | Chung et al. |
| 2012/0114065 A1 | 5/2012 | Luo et al. |
| 2012/0320874 A1 | 12/2012 | Li et al. |
| 2013/0021979 A1 | 1/2013 | Kwon et al. |
| 2013/0040684 A1 | 2/2013 | Yu et al. |
| 2014/0323143 A1 | 10/2014 | Jung et al. |
| 2017/0311217 A1 | 10/2017 | Jung et al. |
| 2018/0042000 A1 | 2/2018 | Zhang et al. |

FOREIGN PATENT DOCUMENTS

| | | |
|---|---|---|
| CN | 105122900 A | 12/2015 |
| EP | 1492252 A1 | 12/2004 |
| EP | 2555568 A2 | 2/2013 |
| JP | 2003-283394 A | 10/2003 |
| JP | 2013-093910 A | 5/2013 |
| JP | 2013-528968 A | 7/2013 |
| JP | 2015-023441 A | 2/2015 |
| JP | M16-506681 A | 3/2016 |
| KR | 10-2011-0108536 A | 10/2011 |
| KR | 10-2014-0084821 A | 7/2014 |
| WO | 2003/081805 A1 | 10/2003 |
| WO | 2011/122834 A2 | 10/2011 |
| WO | 2014/104800 A1 | 7/2014 |

OTHER PUBLICATIONS

Notice of Allowance for U.S. Appl. No. 15/761,589, dated Jun. 10, 2019, 09 pages.

International Search Report and Written Opinion of PCT Application No. PCT/JP2016/070325, dated Sep. 27, 2016, 07 pages of English Translation and 07 pages of ISRWO.

International Preliminary Report on Patentability of PCT Application No. PCT/JP2016/070325, dated Apr. 19, 2018, 07 pages of English Translation and 04 pages of IPRP.

* cited by examiner

APPARATUS AND METHOD FOR BEAM SELECTION IN DOWNLINK TRANSMISSION

CROSS REFERENCE TO RELATED APPLICATIONS

The present application is a continuation application of U.S. patent application Ser. No. 15/761,589, filed on Mar. 20, 2018, which is a National Stage Entry of Patent Application No. PCT/JP2016/070325 filed on Jul. 8, 2016, which claims priority from prior Japanese Patent Application JP 2015-198343 filed in the Japan Patent Office on Oct. 6, 2015, the entire contents of which are hereby incorporated by reference.

TECHNICAL FIELD

The present disclosure relates to an apparatus and a method.

BACKGROUND ART

Wireless communication environment in recent years faces a problem of a rapid increase in data traffic. Hence, in 3GPP, installing a large number of small cells in a macro cell to increase network density, thereby distributing traffic, has been under study. Such a technology utilizing small cells is referred to as small cell enhancement. Note that small cells may conceptually include various types of cells (e.g., a femto cell, a nano cell, a pico cell, a micro cell, and the like) that are smaller than a macro cell and are arranged to overlap a macro cell.

In addition, as one way to expand radio resources, utilization of a frequency band of 6 GHz or more, which is called a millimeter-wave band, has been under study. However, since the millimeter-wave band has strong straightness and exhibits large radio propagation attenuation, utilization in a small cell smaller than a macro cell is expected. Since the millimeter-wave band is extensive, technologies for efficiently selecting an appropriate frequency for communication from such an extensive frequency band have become important. One such technology involves measuring a state (specifically, a characteristic or quality) of a channel using a reference signal. For example, a base station can select an appropriate channel for communication with a terminal apparatus by measuring an uplink reference signal transmitted from the terminal apparatus. As another technology regarding uplink, for example, Patent Literature 1 mentioned below discloses a technology for setting appropriate transmission power of an uplink signal.

CITATION LIST

Patent Literature

Patent Literature 1: JP 2013-93910A

DISCLOSURE OF INVENTION

Technical Problem

It is assumed that beamforming is performed in downlink transmission in which the millimeter-wave band is used in order to compensate for attenuation of radio wave propagation. Since appropriate beams can be different depending on positional relationships of a base station and a terminal apparatus, it is desirable to select an appropriate beam on the basis of a measurement result of a reference signal, however, the process of measuring the reference signal can be complicated because the millimeter-wave band is extensive. Thus, it is desirable to provide a mechanism that enables a beam appropriate for downlink transmission to be more efficiently selected.

Solution to Problem

According to the present disclosure, there is provided an apparatus including: an acquisition unit configured to acquire setting information from a base station; and a selection support unit configured to transmit an uplink reference signal to be used for selecting a beam to be used by the base station in downlink transmission using at least one first unit frequency band of a group including a plurality of unit frequency bands indicated by the setting information.

In addition, according to the present disclosure, there is provided an apparatus including: a setting unit configured to transmit setting information indicating at least one first unit frequency band of a group including a plurality of unit frequency bands to a terminal apparatus; and a selection unit configured to select a beam to be used in downlink transmission on a basis of a measurement result of an uplink reference signal transmitted by the terminal apparatus using the first unit frequency band.

In addition, according to the present disclosure, there is provided a method including: acquiring setting information from a base station; and transmitting, by a processor, an uplink reference signal to be used for selecting a beam to be used by the base station in downlink transmission using at least one first unit frequency band of a group including a plurality of unit frequency bands indicated by the setting information.

In addition, according to the present disclosure, there is provided a method including: transmitting setting information indicating at least one first unit frequency band of a group including a plurality of unit frequency bands to a terminal apparatus; and selecting, by a processor, a beam to be used in downlink transmission on a basis of a measurement result of an uplink reference signal transmitted by the terminal apparatus using the first unit frequency band.

Advantageous Effects of Invention

According to the present disclosure described above, a mechanism that enables a beam appropriate for downlink transmission to be more efficiently selected is provided. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
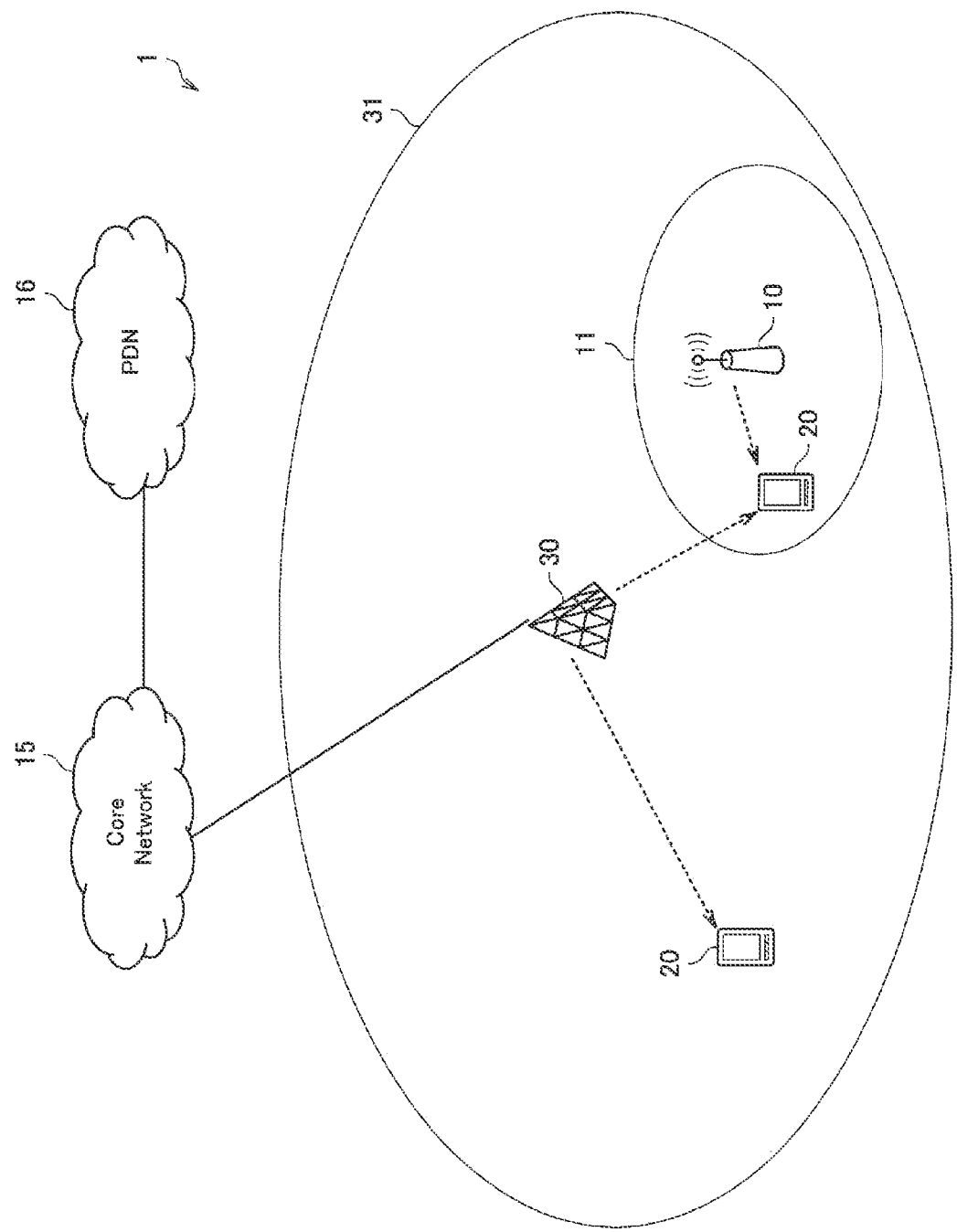
FIG. 1 is an explanatory diagram for describing an overview of a system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be given in the following order.
1. Introduction
1.1. Small cell
1.2. Carrier aggregation
1.3. Examination regarding millimeter-wave band
1.4. Beamforming
2. Configuration examples
2.1. Configuration example of base station
2.2. Configuration example of terminal apparatus
3. First Embodiment
3.1. Technical problems
3.2. Technical features
3.3. Flow of process
4. Second Embodiment
4.1. Technical problems
4.2. Technical features
4.3. Flow of process
5. Third Embodiment
5.1. Technical problems
5.2. Technical features
6. Fourth Embodiment
6.1. Technical problems
6.2. Technical features
7. Application examples
8. Conclusion

1. Introduction

<1.1. Small Cell>

FIG. 1 is an explanatory diagram for describing an overview of a system 1 according to an embodiment of the present disclosure. As illustrated in FIG. 1, the system 1 includes a base station 10, a terminal apparatus 20, and a communication control apparatus 30.

In the example of FIG. 1, the communication control apparatus 30 is a macro cell base station. The macro cell base station 30 provides a wireless communication service for one or more terminal apparatuses 20 located inside a macro cell 31. The macro cell base station 30 is connected to a core network 15. The core network 15 is connected to a packet data network (PDN) 16 via a gateway apparatus (not illustrated). The macro cell 31 may be operated in accordance with any wireless communication scheme, such as long term evolution (LTE), LTE-advanced (LTE-A), GSM (registered trademark), UMTS, W-CDMA, CDMA200, WiMAX, WiMAX2, or IEEE802.16, for example. Note that without being limited to the example of FIG. 1, a control node in the core network 15 or the PDN 16 (a host node of the macro cell base station) may have a function of controlling wireless communication in a macro cell and a small cell in a cooperative manner. Note that the macro cell base station may also be referred to as a Macro eNodeB.

The base station 10 is a small cell base station that operates a small cell 11. Typically, the small cell base station 10 is authorized to allocate radio resources to the terminal apparatus 20 that connects to the own apparatus. However, allocation of radio resources may be at least partially entrusted to the communication control apparatus 30 for cooperative control. A base station 10 may be a small cell base station fixedly installed as illustrated in FIG. 1, or may be a dynamic access point (AP) that dynamically operates the small cell 11. Note that the small cell base station may also be referred to as a pico eNB or a Femto eNB.

The terminal apparatus 20 connects to the macro cell base station 30 or the small cell base station 10 to enjoy a wireless communication service. For example, the terminal apparatus 20 that connects to the small cell base station 10 receives a control signal from the macro cell base station 30, and receives a data signal from the small cell base station 10. The terminal apparatus 20 is also called a user. The user may also be called user equipment (UE). Here, UE may be UE defined in LTE or LTE-A, or more generally may mean communication equipment.

<1.2. Carrier Aggregation>

A technology related to carrier aggregation prescribed in LTE Release 10 (i.e., 3GPP Release 10) is described below.

(1) Component Carrier

Carrier aggregation is a technology of improving throughput of communication by forming a communication channel between a base station and a terminal apparatus by aggregating a plurality of unit frequency bands supported in LTE, for example. Individual unit frequency bands included in one communication channel formed by carrier aggregation are referred to as component carriers (CCs). Here, a CC may be a CC defined in LTE or LTE-A, or more generally may mean a unit frequency band.

In LTE Release 10, it is possible to aggregate five CCs at maximum. In addition, one CC has a width of 20 MHz. Note that the CCs to be aggregated may be arranged consecutively on a frequency axis, or may be arranged apart from each other. Moreover, which CC to aggregate and use can be set for each terminal apparatus.

Figure 2:
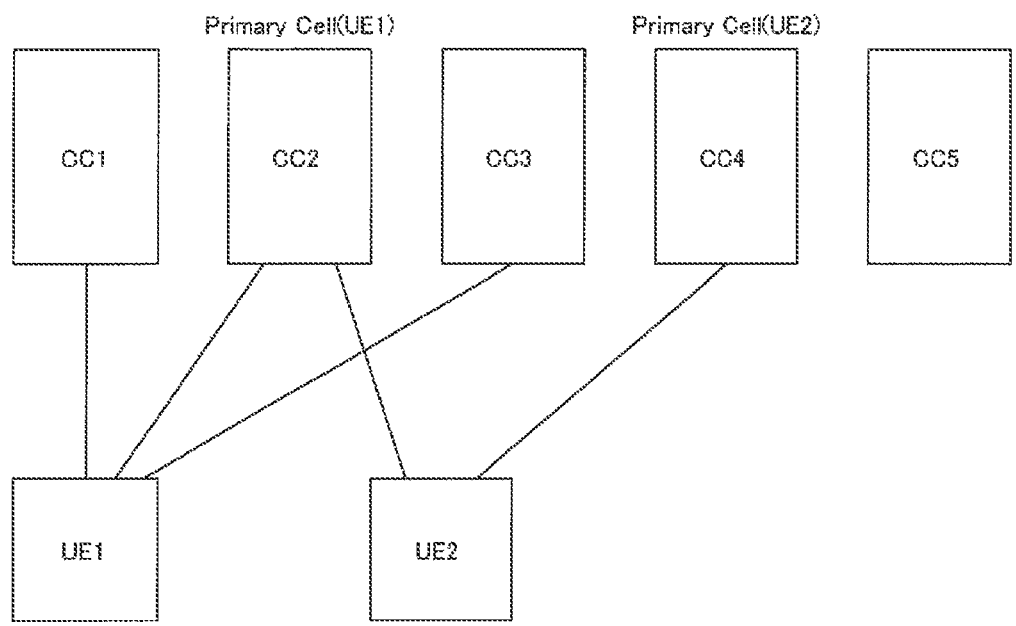
FIG. 2 is an explanatory diagram for describing component carriers.

The plurality of CCs that are aggregated are classified into one primary component carrier (PCC) and a secondary component carrier (SCC) other than the PCC. The PCC is different for each terminal apparatus. Since the PCC is the most important CC, it is desirable that the CC with the most stable communication quality be selected. FIG. 2 is an explanatory diagram for describing component carriers. In the example illustrated in FIG. 2, a situation in which two pieces of UE use some of five CCs in aggregation is illustrated. In detail, UE1 uses CC1, CC2, and CC3 in aggregation, and UE2 uses CC2 and CC4 in aggregation. Moreover, the PCC of UE1 is CC2. The PCC of UE2 is CC4.

Here, selection of a PCC is dependent on implementation. An SCC is changed by deleting the SCC and adding another SCC. That is, it is difficult to directly change an SCC.

(2) Formation and Change of PCC

In the case where a terminal apparatus transitions from an RRC Idle state to an RRC Connected state, the CC in which connection is established first is the PCC. A change of the PCC is performed through a procedure similar to handover.

A PCC is formed through a procedure called Connection establishment. This procedure is a procedure started with a request from the terminal apparatus side used as a trigger.

A PCC is changed through a procedure called Connection Reconfiguration. This procedure includes transmission and reception of handover messages. This procedure is a procedure started from the base station side.

(3) Addition of SCC

An SCC is added through a procedure called Connection Reconfiguration. This procedure is a procedure started from the base station side. An SCC is added to a PCC and belongs to the PCC. Adding an SCC is also referred to as activating an SCC.

(4) Deletion of SCC

An SCC is deleted through a procedure called Connection Reconfiguration. This procedure is a procedure started from the base station side. In this procedure, a specific SCC designated in a message is deleted. Note that deletion of an SCC is performed also through a procedure called Connection Re-establishment. This procedure is a procedure started from the terminal apparatus side. Through this procedure, all the SCCs are deleted. Deleting an SCC is also referred to as deactivating an SCC.

(5) Special Role of PCC

A PCC has a special role different from that of an SCC. For example, transmission and reception of NAS signaling in Connection establishment is performed only in the PCC. In addition, transmission of a physical uplink control channel (PUCCH) is performed only in the PCC. Note that examples of an uplink control signal include ACK or NACK indicating success for failure of reception for data transmitted in downlink, a scheduling request, and the like. Moreover, a procedure from detection of Radio Link Failure to Connection Re-establishment is also performed only in the PCC.

(6) LTE Release 12

In LTE Release 12, a scenario is shown in which a macro cell base station and a small cell base station use different frequencies. For example, a frequency of approximately 2 GHz may be allocated to the macro cell base station, and a high frequency such as 5 GHz may be allocated to the small cell base station.

<1.3. Examination Regarding Millimeter-Wave Band>

Examination regarding a millimeter-wave band will be described below.

(1) Definition

In general, a radio wave having a frequency of 3 GHz to 30 GHz (i.e., a wavelength of 1 cm to 10 cm) is also called a centimeter wave. In addition, a radio wave having a frequency of 30 GHz to 300 GHz (i.e., a wavelength of 1 cm to 1 mm) is also called a millimeter wave. In addition, a radio wave having a frequency of 10 GHz to 30 GHz is also called a quasi-millimeter wave. A millimeter-wave band is a frequency band of 6 GHz or higher among the above-mentioned frequencies in the present specification. That is, a millimeter wave in the present specification also conceptually includes a general centimeter wave.

(2) Relationship with Component Carrier

A millimeter-wave band has extensive frequency resources. Thus, LTE release 10 assumes that a bandwidth of a CC having a frequency of 20 MHz can be changed into a wider bandwidth of, for example, 40 MHz, 80 MHz, or 160 MHz in the millimeter-wave band.

(3) Line-of-Sight Communication

A radio wave wanders less and straightness thereof is intensified when it has a higher frequency. In addition, a radio wave attenuates more when reflected if it has a higher frequency. Thus, it can be said that radio waves, particularly those with a frequency of 10 GHz or higher, of a millimeter-wave band are basically assumed to be used in line-of-sight communication.

(4) Radio Wave Propagation Loss in Each Frequency Band

Typically, radio wave propagation loss (i.e., path loss) becomes significant and radio waves attenuate in accordance with the square of a frequency. For example, a frequency of a 20 GHz band attenuates 12 dB more than a frequency of a 5 GHz band. A frequency of a 60 GHz band attenuates 22 dB more than the frequency of the 5 GHz band. The millimeter-wave band lies in an extensive band range, for example, from 6 GHz to 60 GHz. It can be said that the millimeter-wave band has an extensive band range when it is compared with LTE currently using the 2 GHz band. In addition, radio waves in the millimeter-wave band do not have a uniform property due to the extensiveness of the band, and there are cases in which radio waves that belong to the same millimeter-wave band have significantly different properties.

It is known that radio waves do not easily reach a destination when the radio waves have higher frequencies of 6 GHz or higher. Thus, in a case in which radio waves of a millimeter-wave band are used to establish a link between a UE and an eNB, it is hard to guarantee that the link can be stably maintained. For this reason, control of radio waves having a higher frequency using radio waves having a lower frequency has been suggested. Actually, in the examination of small cells in LTE Release 12, a technology of controlling a CC of a 5 GHz band using a CC of a 2 GHz band has been discussed.

The millimeter-wave band has resources in a wide range of about 6 GHz to 60 GHz. Thus, even if the resources in the wide range are attempted to be controlled using CCs of the 2 GHz band, resources of the CCs of the 2 GHz band may be insufficient.

(5) Change of Subcarrier Spacing

Subcarrier spacing of orthogonal frequency division multiplexing (OFDM) in LTE at the time of 3GPP Release 12 is 15 kHz. The bandwidth of 15 kHz is defined to be subject to flat fading in units of subcarriers. Thus, even when frequency-selective fading occurs in a whole bandwidth (e.g., the bandwidth of 20 MHz), flat fading eventually occurs in units of subcarriers. As described, the bandwidth of 15 kHz is advantageous in that characteristics of a frequency thereof deteriorate little at the time of reception of the frequency.

It is predicted in the frequency band of 10 GHz to 60 GHz that a frequency width in which occurrence of flat fading can be anticipated becomes large. It is considered possible, for example, to change subcarrier spacing of 15 kHz in the 2 GHz band into subcarrier spacing of 150 kHz in the 20 GHz band.

However, since such a change of subcarrier spacing exerts a great impact on the specifications of LTE, it is hard to assume that subcarrier spacing can be changed without going through stages. Thus, it is considered desirable to change subcarrier spacing in, for example, about four stages of 15 kHz, 30 kHz, 60 kHz, and 120 kHz. This is because, even if subcarrier spacing is divided into more stages, effects brought by more stages are not appreciable when it comes to such a significant change in the specifications. The following table shows an example of a setting of a case in which subcarrier spacing can be changed in four stages.

TABLE 1

| OFDM subcarrier spacing | Frequency | Frequency bandwidth of one CC | Number of CCs |
| --- | --- | --- | --- |
| 15 kHz | smaller than 10 GHz | 20 MHz | 30 |
| 30 kHz | 10 GHz to 30 GHz | 40 MHz | 400 |
| 60 kHz | 30 GHz to 60 GHz | 80 MHz | 400 |
| 120 kHz | Higher than 60 GHz | 160 MHz | 200 |

However, even if OFDM subcarrier spacing can be changed in about four stages, the problem of an increasing load of CCs of a low frequency band (e.g., the band of 2 GHz) is still not solved. This is because the millimeter-wave band has extensive frequency resources and a large number of control signals are necessary. Referring to Table 1 above, it can be ascertained that there are a large number of CCs to be controlled included in millimeter-wave bands.

Note that there are still questions about whether OFDM is to be employed for bands of 60 GHz or higher. However, even in a case in which a schedule of signals to be handled in accordance with a frequency band to be used is changed, there is no doubt that there are extensive frequency resources and a large number of control targets.

(6) UE Capability

Since the millimeter-wave band has extensive frequency regions, the number of CCs is large accordingly. In a case in which there are hundreds of CCs, it can be conceived that, while there are pieces of UE that can use about, for example, 100 CCs together, there are pieces of UE which can use a maximum of several CCs together. It should be noted that pieces of UE can have different capabilities in the millimeter-wave band as described above.

(7) CCs with Same Characteristic

CCs having a bandwidth of 20 MHz are used in a 2 GHz band and a 5 GHz band, and channel characteristics of the CCs could be different in the related art. On the other hand, there is a tendency in the millimeter-wave band for a channel characteristic to become flat and channel characteristics of CCs to become identical as a frequency becomes higher. For example, in the band of 30 GHz, a channel characteristic becomes flat through a frequency band of about 200 MHz. When a terminal apparatus that can process only CCs having a bandwidth of 20 MHz is assumed to be present, managing resources by dividing a bandwidth of 200 MHz into CCs having bandwidths of 20 MHz may be desirable. In this case, channel characteristics of the CCs having the bandwidths of 20 MHz with close frequencies can be substantially identical.

<1.4. Beamforming>

It is assumed that beamforming is performed in the millimeter-wave band in order to compensate for attenuation of radio wave propagation. This is because antenna gain obtained by performing beamforming enables attenuation of radio wave propagation to be compensated for. This antenna gain is obtained by concentrating a beam in a specific direction, rather than radiating radio waves in all directions. This is because energy scattering in all directions is concentrated in one direction.

Antenna gain increases as a beam is sharper. Thus, it is effective to dispose many antenna elements in order to make antenna gain large. When the millimeter-wave band is adopted, it is desirable to dispose hundreds of antennas. For this reason, beamforming is assumed to be used on a base station side, rather than a terminal apparatus side. This is because mounting hundreds of antennas on a terminal apparatus is not appropriate in light of its space and calculation processing capability.

When a case in which a base station performs beamforming is assumed, it is desirable to select a beam appropriate for each of terminal apparatuses. This selection may be made by the terminal apparatuses or the base station. However, the base station is considered to make the final selection. When a beam for downlink transmission performed from a base station to a terminal apparatus is selected, it is desirable to enable a state of a downlink channel to be measured directly or indirectly.

A downlink reference signal can be used to measure a downlink channel. However, since radio waves significantly attenuate in the millimeter-wave band, there are cases in which it is difficult to accurately measure a state of a channel using an omni-directional downlink reference signal. Thus, it is desirable to subject downlink reference signals to beamforming. However, since a state of a downlink channel is unknown in the state of transmission of a downlink reference signal, beamforming is difficult to perform only in a proper direction. Therefore, a technique in which a downlink reference signal that has undergone beamforming is transmitted in all directions and a terminal apparatus sequentially measures channels while changing measurement times is considered. According to this technique, however, a large amount of processing time and power consumption would be necessary for the terminal apparatus.

Therefore, a technique in which a state of an uplink channel is measured using an uplink reference signal and a state of a downlink channel is measured on the basis of the state of the uplink channel is important. For example, in a time division duplex (TDD) system in which the same channel is used in uplink and downlink, channel characteristics are the same in uplink and downlink, and thus the above-described technique is particularly effective. In a case in which the technique is applied to beamforming of a downlink reference signal, a base station selects a beam appropriate for transmission of a downlink reference signal on the basis of a measurement result of an uplink reference signal transmitted from a terminal apparatus. In this case, the downlink reference signal is transmitted in only a specific direction and the terminal apparatus does not transmit the uplink reference signal in many directions, and thus a beam for downlink transmission can be selected in a short period of time.

However, the following problems arise when the above-mentioned technique is assumed to be applied in the millimeter-wave band.

A first problem is that the millimeter-wave band is extensive. The uplink reference signal transmitted by the terminal apparatus is transmitted on each of CCs, and thus is assumed to be used for measurement of each CC. This is because the CCs can have different characteristics. Since there can be hundreds of CCs in the millimeter-wave band with regard to this problem, it is desirable to provide a mechanism that enables efficient measurement of each CC.

A second problem is that antenna gain is small regardless of whether the uplink reference signal is omni-directional or directional. This is because the number of antennas that can be mounted in the terminal apparatus is assumed to be about 8 due to limited mounting space. Since attenuation of radio wave propagation is significant in the millimeter-wave band, in a case in which a signal is omni-directional or antenna gain is small, there is a possibility of the base station failing in receiving the uplink reference signal.

2. Configuration Examples

<2.1. Configuration Example of Base Station>

Figure 3:
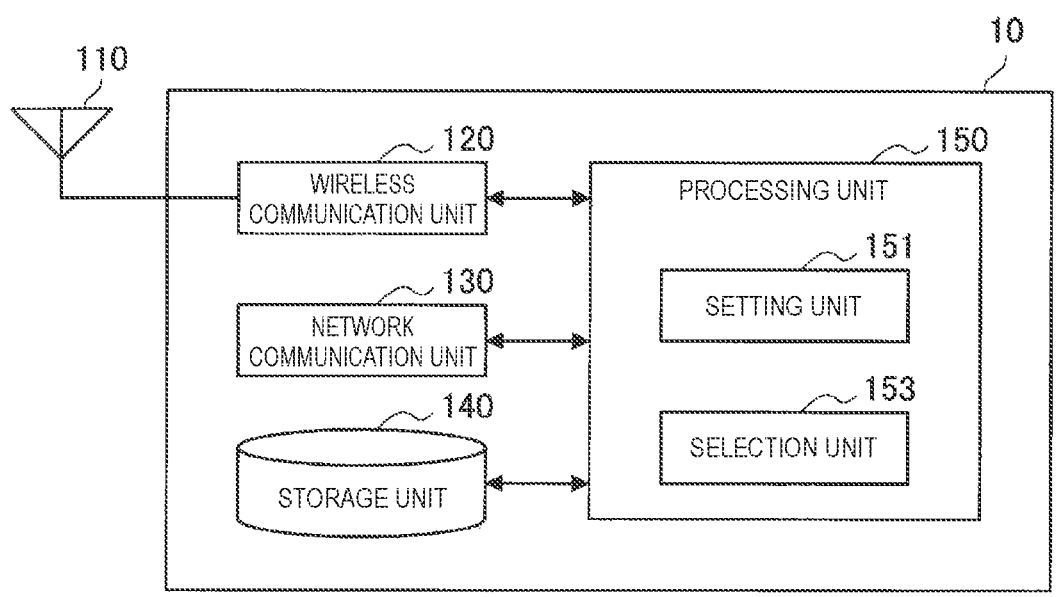
FIG. 3 is a block diagram illustrating an example of the configuration of a base station according to the embodiment.

Next, the configuration of the base station 10 according to an embodiment of the present disclosure will be described with reference to FIG. 3. FIG. 3 is a block diagram illustrating an example of the configuration of the base station 10 according to an embodiment of the present disclosure. Referring to FIG. 3, the base station 10 includes an antenna unit 110, a wireless communication unit 120, a network communication unit 130, a storage unit 140, and a processing unit 150.

(1) Antenna Unit 110

The antenna unit 110 radiates a signal output by the wireless communication unit 120, in the form of radio waves, into space. The antenna unit 110 also converts radio waves in space into a signal, and outputs the signal to the wireless communication unit 120.

(2) Wireless Communication Unit 120

The wireless communication unit 120 transmits and receives signals. For example, the wireless communication unit 120 transmits a downlink signal to the terminal apparatus and receives an uplink signal from the terminal apparatus.

(3) Network Communication Unit 130

The network communication unit 130 transmits and receives information. For example, the network communication unit 130 transmits information to other nodes and receives information from other nodes. For example, the other nodes include other base stations and a core network node.

(4) Storage Unit 140

The storage unit 140 temporarily or permanently stores a program and various data for operation of the base station 10.

(5) Processing Unit 150

The processing unit 150 provides various functions of the base station 10. The processing unit 150 includes a setting unit 151 and a selection unit 153. Note that the processing unit 150 may further include a structural element other than these structural elements. That is, the processing unit 150 may perform operation other than the operation of these structural elements.

Operations of the setting unit 151 and the selection unit 153 will be described below in detail.

<2.2. Configuration Examples of Terminal Apparatus>

Figure 4:
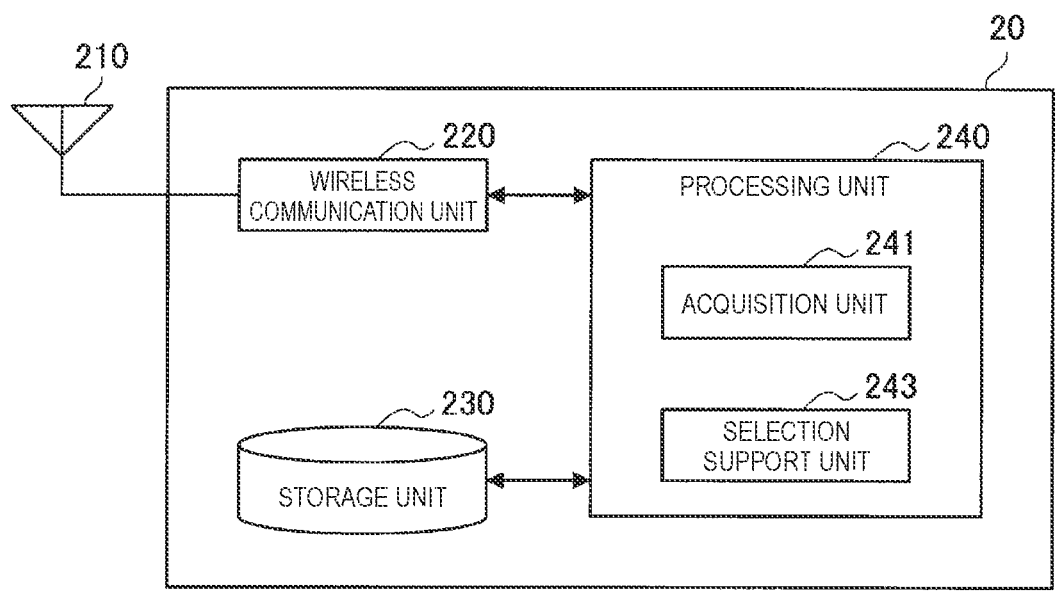
FIG. 4 is a block diagram illustrating an example of the configuration of a terminal apparatus according to the embodiment.

Next, an example of the configuration of the terminal apparatus 20 according to an embodiment of the present disclosure will be described with reference to FIG. 4. FIG. 4 is a block diagram illustrating an example of the configuration of the terminal apparatus 20 according to an embodiment of the present disclosure. Referring to FIG. 4, the terminal apparatus 20 includes an antenna unit 210, a wireless communication unit 220, a storage unit 230 and a processing unit 240.

(1) Antenna Unit 210

The antenna unit 210 radiates a signal output by the wireless communication unit 220, in the form of radio waves, into space. The antenna unit 210 also converts radio waves in space into a signal, and outputs the signal to the wireless communication unit 220.

(2) Wireless Communication Unit 220

The wireless communication unit 220 transmits and receives signals. For example, the wireless communication unit 220 receives a downlink signal from the base station and transmits an uplink signal to the base station.

(3) Storage Unit 230

The storage unit 230 temporarily or permanently stores a program and various data for operation of the terminal apparatus 20.

(4) Processing Unit 240

The processing unit 240 provides various functions of the terminal apparatus 20. The processing unit 240 includes an acquisition unit 241 and a selection support unit 243. Note that the processing unit 240 may further include a structural element other than these structural elements. That is, the processing unit 240 may perform operation other than the operation of these structural elements.

Operations of the acquisition unit 241 and the selection support unit 243 will be described below in detail.

3. First Embodiment

<3.1. Technical Problem>

The technical problem of the present embodiment is the above-described first problem. In more detail, since there are a large number of CCs in the millimeter-wave band, combining a plurality of CCs and using them at the same time (i.e., performing carrier aggregation) is assumed in order to increase a data transmission speed. Since it is required to select an appropriate beam using each of the plurality of CCs to be used at the same time, measuring channel characteristics of each of the CCs can be a great burden for a terminal apparatus in terms of power consumption.

Thus, a mechanism for efficiently measuring each of CCs is provided in the present embodiment.

<3.2. Technical Features>

(1) Grouping of CCs

In the present embodiment, a group constituted by some CCs among a plurality of CCs that are available for the base station 10 is defined. This group includes at least one (typically, a plurality of) CC(s). This group will also be referred to as an uplink RS group below. One uplink RS group includes at least one uplink RS primary CC. An example of an uplink RS group is shown in FIG. 5.

Figure 5:
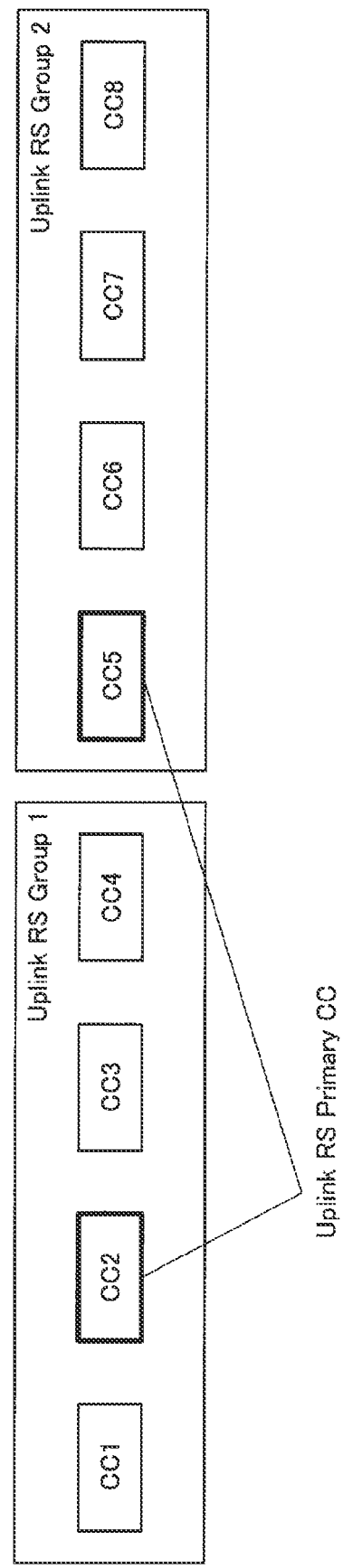
FIG. 5 is an explanatory diagram for describing a technical feature of a first embodiment.

FIG. 5 shows the example of the uplink RS group including four CCs. A first uplink RS group includes CC1 to CC4, and CC2 is an uplink RS primary CC. A second uplink RS group includes CC5 to CC8, and CC5 is an uplink RS primary CC. The number of CCs included in one uplink RS group is arbitrary. In addition, a position of an uplink RS primary CC included in each uplink RS group is also arbitrary. Note that an uplink RS primary CC corresponds to a first unit frequency band. CCs other than an uplink RS primary CC included in an uplink RS group correspond to a second unit frequency band.

(2) Beam Selection

The terminal apparatus 20 (e.g., the selection support unit 243) transmits an uplink reference signal to be used for selecting a beam that is used by the base station 10 in downlink transmission using at least one uplink RS primary CC of an uplink RS group including a plurality of CCs indicated by setting information which will be described below. Note that an uplink reference signal will also be referred to as an uplink RS below. An uplink RS can also be called a sounding reference signal (RSR) in the existing LTE technology. An uplink RS is transmitted only on the uplink RS primary CC of the uplink RS group. Thus, power consumption of the terminal apparatus 20 can be reduced in comparison to a case in which an uplink RS is transmitted on all of a large number of CCs of the millimeter-wave band.

The base station 10 (e.g., the selection unit 153) selects a beam to be used in downlink transmission on the basis of a measurement result of the uplink RS transmitted by the terminal apparatus 20 using the uplink RS primary CC. For example, the base station 10 (e.g., the selection unit 153) measures a reception beam that increases a signal-to-noise ratio (SNR) of the uplink RS while virtually changing the reception beam with respect to the uplink RS, and selects a transmission beam appropriate for the terminal apparatus 20 on the basis of the measurement result.

Then, the base station 10 (e.g., the selection unit 153) transmits a downlink reference signal using the selected beam. Note that a downlink reference signal will also be referred to as a downlink RS below. Since the beam compensates for radio wave attenuation of the millimeter-wave band, the terminal apparatus 20 can succeed in reception of the downlink RS and thus accurately measure a state of the channel. The base station 10 may transmit the downlink RS using all of the plurality of CCs included in the uplink RS group. In this case, the terminal apparatus 20 can measure each of the CCs included in the uplink RS group The base station 10 (e.g., the selection unit 153) may select one or more beams on the basis of the uplink RS. That is, the base station 10 may narrow down beam candidates to one or more on the basis of the uplink RS. In this case, the base station 10 transmits one or more downlink RSs using the narrowed-down one or more beam candidates. The terminal apparatus 20 (e.g., the selection support unit 243) transmits information regarding measurement of the downlink RSs transmitted by the base station 10 using the one or more beams selected on the basis of the uplink RS (i.e., gives feedback) to the base station 10. The terminal apparatus 20 may simply feed information indicating the measurement result of the downlink RSs back, or select a beam appropriate for downlink transmission on the basis of the measurement result and feed the selection result back. In the latter case, the terminal apparatus 20 further narrows down the one or more beam candidates that have been narrowed down by the base station 10. Note that the feedback can be transmitted using the uplink RS primary CC. Thereafter, the base station 10 decides a beam to be used in downlink data transmission from the candidates on the basis of the feedback. Using the above-described procedure, the base station 10 can select a beam on the basis of measurement results of respective CCs included in the uplink RS group, and thus more appropriate beams selection is realized.

(3) Setting

The base station 10 and the terminal apparatus 20 set uplink RS groups and an uplink RS primary CC of each of the uplink RS groups.

To perform the setting, the base station 10 and the terminal apparatus 20 acquire information indicating a plurality of CCs included in each of the uplink RS groups (i.e., information indicating which CC belongs to which uplink RS group). Such information will also be referred to as group information below. In addition, the base station 10 and the terminal apparatus 20 acquire information indicating an uplink RS primary CC of each of the uplink RS groups (i.e., information indicating which CC is an uplink RS primary CC). Such information will also be referred to as primary information below. The base station 10 and the terminal apparatus 20 can set uplink RS groups and an uplink RS primary CC of each of the uplink RS groups by acquiring group information and primary information. Note that group information and primary information correspond to setting information.

The base station 10 acquires setting information from, for example, Mobility Management Entity (MME). Alternatively, the base station 10 may acquire the information via an Operation & Maintenance (O&M) interface or the like. In addition, the terminal apparatus 20 (e.g., the acquisition unit 241) acquires the setting information from the base station 10. In the reverse perspective, the base station 10 (e.g., the setting unit 151) can also be said to notify the terminal apparatus 20 of the setting information. Dedicated signaling, for example, can be used in this notification. The setting information may be common for all base stations 10 included in the system 1, or may be different among the base stations 10. For example, group information may be common but primary information may be different among the base stations 10 (i.e., among cells). In this case, each of the base station 10 (e.g., the setting unit 151) can acquire the group information from MME, select an uplink RS primary CC by itself, and notify a terminal apparatus 20, which is under its dominion, of the group information and the primary information.

<3.3. Flow of Process>

Figure 6:
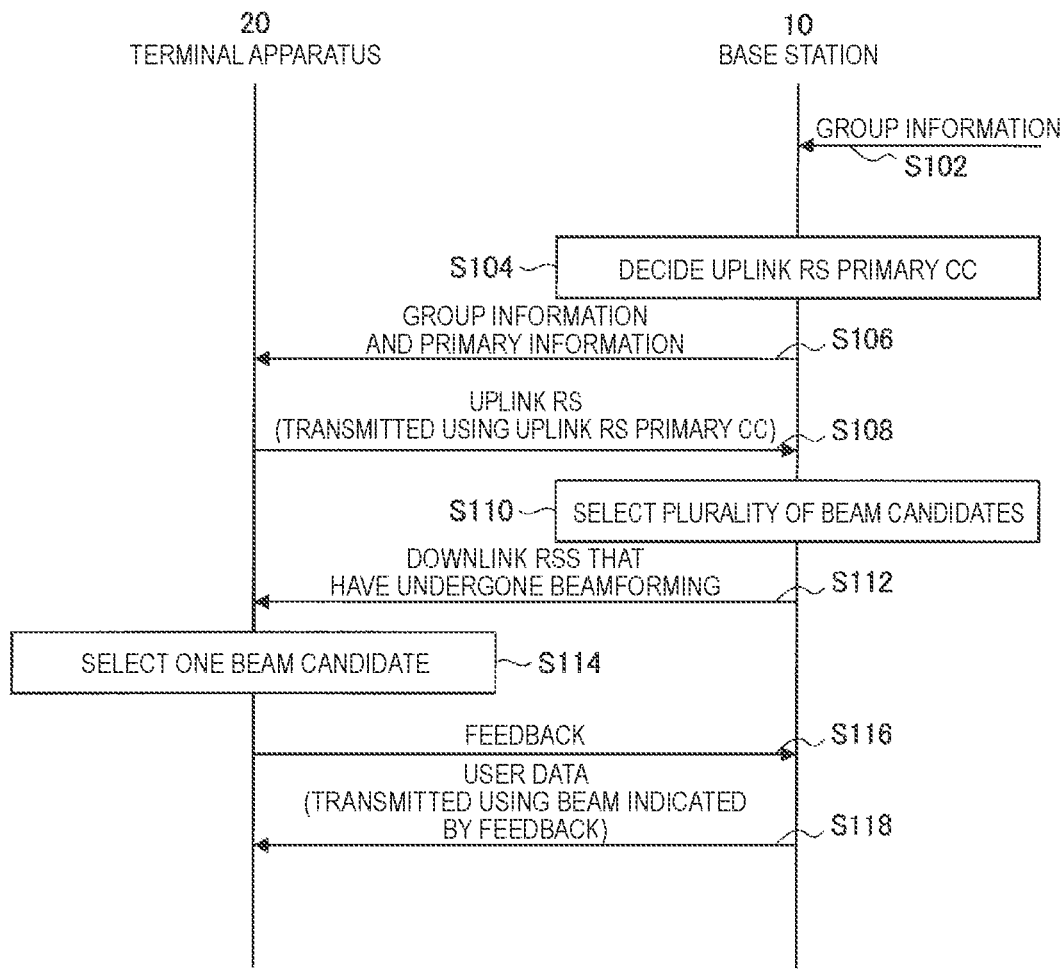
FIG. 6 is a sequence diagram showing an example of a flow of a communication process executed in a system according to the embodiment.

FIG. 6 is a sequence diagram showing an example of a flow of a communication process executed in the system 1 according to the present embodiment. The base station 10 and the terminal apparatus 20 are involved in this sequence.

As shown in FIG. 6, first, the base station 10 acquires group information (Step S102). Then, the base station 10 decides an uplink RS primary CC of each of uplink RS groups indicated by the acquired group information (Step S104). Next, the base station 10 transmits the group information and primary information to the terminal apparatus 20 (Step S106).

Next, the terminal apparatus 20 transmits an uplink RS using the uplink RS primary CC on the basis of the received group information and primary information (Step S108). Next, the base station 10 selects a plurality of beam candidates on the basis of a measurement result of the uplink RS (Step S110). Then, the base station 10 transmits a plurality of downlink RSs that have undergone beamforming using the plurality of selected beam candidates (Step S112).

Next, the terminal apparatus 20 selects one beam candidate appropriate for its downlink transmission on the basis of the measurement results of the downlink RSs that have undergone beamforming (Step S114), and feeds information indicating the selection result back to the base station 10 (Step S116). Note that the base station 10 can receive this feedback using a beam that has been evaluated to be most appropriate for communication with the terminal apparatus 20 among the plurality of beam candidates selected in Step S110. Then, the base station 10 transmits user data to the terminal apparatus 20 using the beam indicated by the feedback from the terminal apparatus 20 (Step S118).

The process ends with the above procedure.

4. Second Embodiment

<4. 1. Technical Problems>

An uplink RS primary CC is set for each cell (i.e., cell-specifically set) in the first embodiment. Thus, resources of an uplink RS primary CC for transmission of an uplink RS can be insufficient depending on the number of terminal apparatuses 20 connected to a cell. In addition, each of terminal apparatuses 20 can have different capabilities. For example, each of the terminal apparatuses 20 can have a different available frequency, a different number of CCs that can be aggregated and used at the same time, a different bandwidth of an available CC, or the like. Thus, each of the terminal apparatuses 20 can have a different appropriate uplink RS primary CC.

Thus, a mechanism which enables an uplink RS primary CC to be set for each of terminal apparatuses 20 is provided in the present embodiment.

<4.2. Technical Features>

The terminal apparatus 20 (e.g., the selection support unit 243) transmits capability information indicating a CC that can be used by the terminal apparatus 20 to the base station 10. This capability information can include, for example, information indicating an available uplink RS group and an available CC included in the uplink RS group. Accordingly, the base station 10 selects an uplink RS primary CC appropriate for the terminal apparatus 20.

The base station 10 (e.g., the setting unit 151) variably sets an uplink RS primary CC for each of terminal apparatuses 20. In particular, the base station 10 selects an uplink RS primary CC on the basis of the capability information. Thus, the selected uplink RS primary CC is appropriate for the terminal apparatus 20. The selection of an uplink RS primary CC based on capability information will be described below with reference to FIG. 7.

Figure 7:
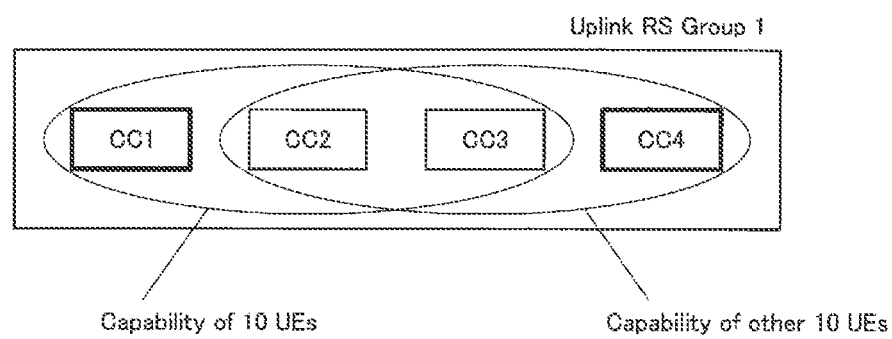
FIG. 7 is an explanatory diagram for describing a technical feature of a second embodiment.

FIG. 7 shows an example of an uplink RS group formed with four CCs including CC1 to CC4. It is assumed that, for example, 10 terminal apparatuses 20 have a capability of using CC1 to CC3, and other 10 terminal apparatuses 20 have a capability of using CC2 to CC4. Since there is a possibility of the CC2 and CC3 being used by a total of 20 terminal apparatuses 20, in a case in which the CCs are used for transmission of an uplink RS, a ratio of the uplink RS occupying data becomes high, and thus overhead can be a problem. Thus, the base station 10 sets an uplink RS primary CC for the 10 terminal apparatuses 20 having the capability of using the CC1 to CC3 to the CC1. In addition, the base station 10 sets an uplink RS primary CC for the 10 terminal apparatuses 20 having the capability of using the CC2 to CC4 to the CC4. With this setting, resource insufficiency of the uplink RS primary CCs for transmission of the uplink RS can be avoided and the uplink RS primary CCs can be set in accordance with the capabilities of the terminal apparatuses 20. Note that the above-described setting method is merely an example, and any of various algorithms can be employed.

<4.3. Flow of Process>

Figure 8:
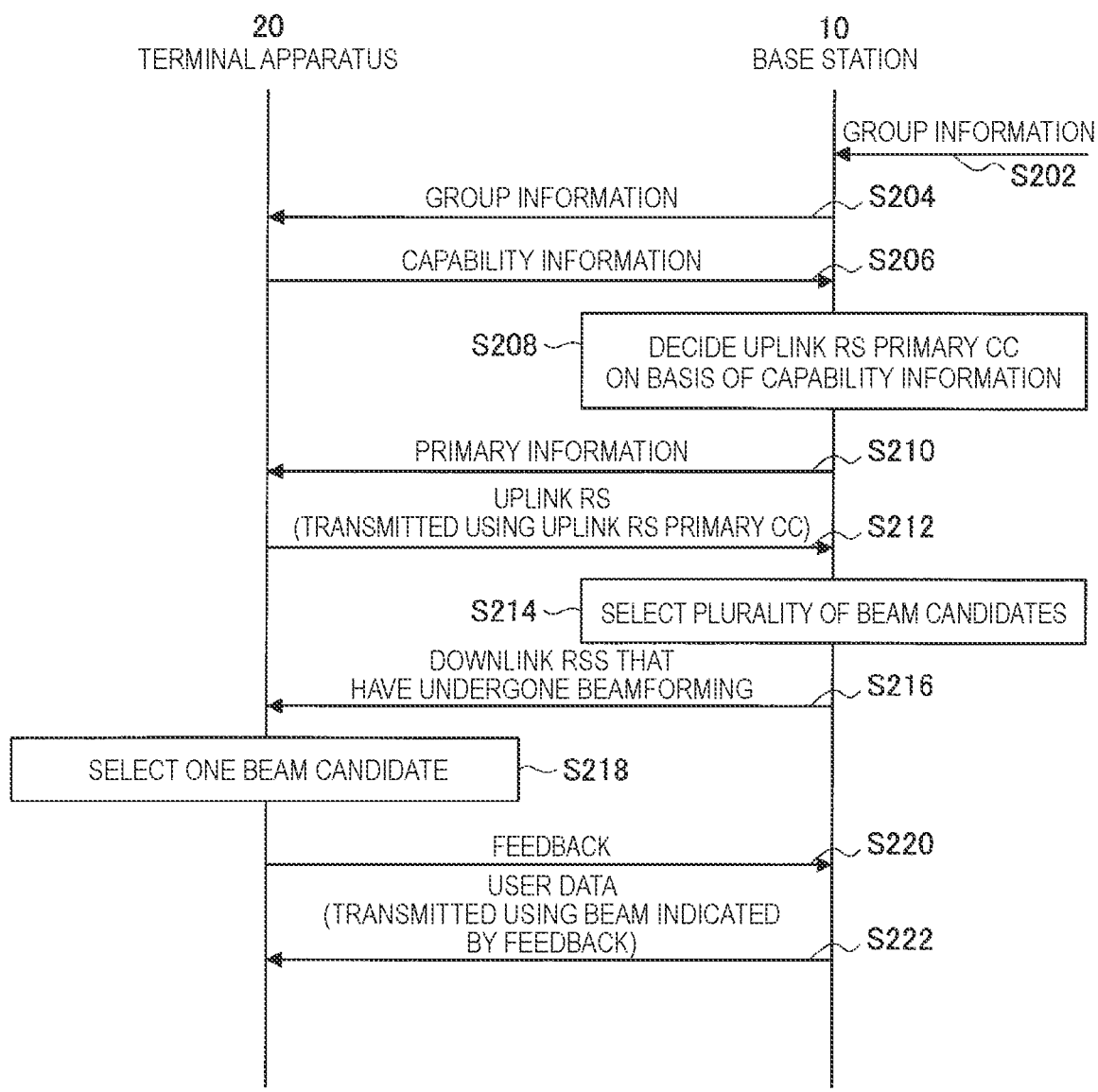
FIG. 8 is a sequence diagram showing an example of a flow of a communication process executed in a system according to the embodiment.

FIG. 8 is a sequence diagram showing an example of a flow of a communication process executed in the system 1 according to the present embodiment. A base station 10 and a terminal apparatus 20 are involved in this sequence.

First, the base station 10 acquires group information as shown in FIG. 8 (Step S202). Next, the base station 10 transmits the acquired group information to the terminal apparatus 20 (Step S204).

The terminal apparatus 20 transmits capability information to the base station 10 at a timing of a radio resource control (RRC)-connected state (Step S206). Then, the base station 10 decides an uplink RS primary CC for the terminal apparatus 20 on the basis of the capability information (Step S208), and transmits primary information to the terminal apparatus 20 (Step S210). Since the following processes of Step S212 to S222 are similar to the above-described processes of Step S108 to S118, detailed description thereof will be omitted here.

The process ends with the above procedure.

5. Third Embodiment

<5.1. Technical Problem>

A technical problem of the present embodiment is the above-descried second problem. To describe in more detail, since attenuation of radio wave propagation is significant in the millimeter-wave bands, an uplink RS can reach the base station 10 in a low SNR state. Thus, selection of a beam can be difficult for the base station 10.

Therefore, a mechanism that enables an uplink RS to reach the base station 10 in a high SNR state is provided in the present embodiment.

<5.2. Technical Features>

Figure 9:
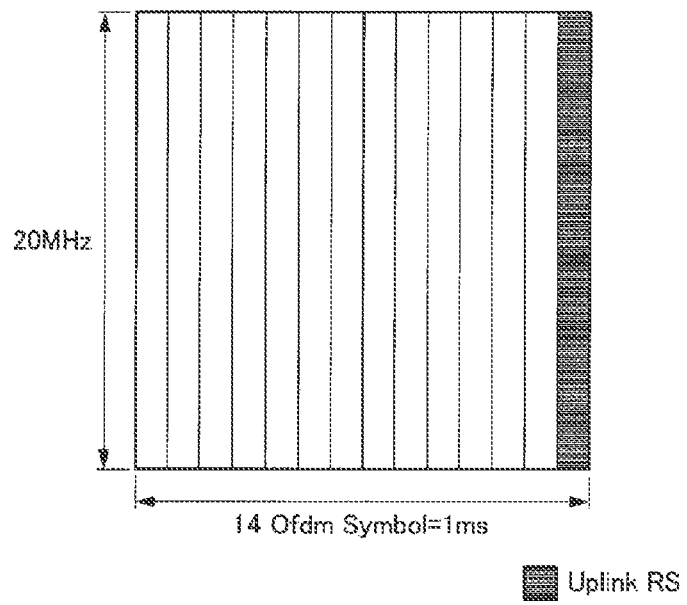
FIG. 9 is an explanatory diagram for describing a technical feature of a third embodiment.

In the existing LTE technology, an uplink RS is called an SRS. In addition, one subframe includes 14 OFDM symbols, and the final $14^{th}$ OFDM symbol transmits an uplink RS. An example of the structure is shown in FIG. 9. In the example shown in FIG. 9, an uplink RS is transmitted in an entire bandwidth of an uplink RS primary CC having a bandwidth of 20 MHz in the $14^{th}$ OFDM symbol.

Figure 10:
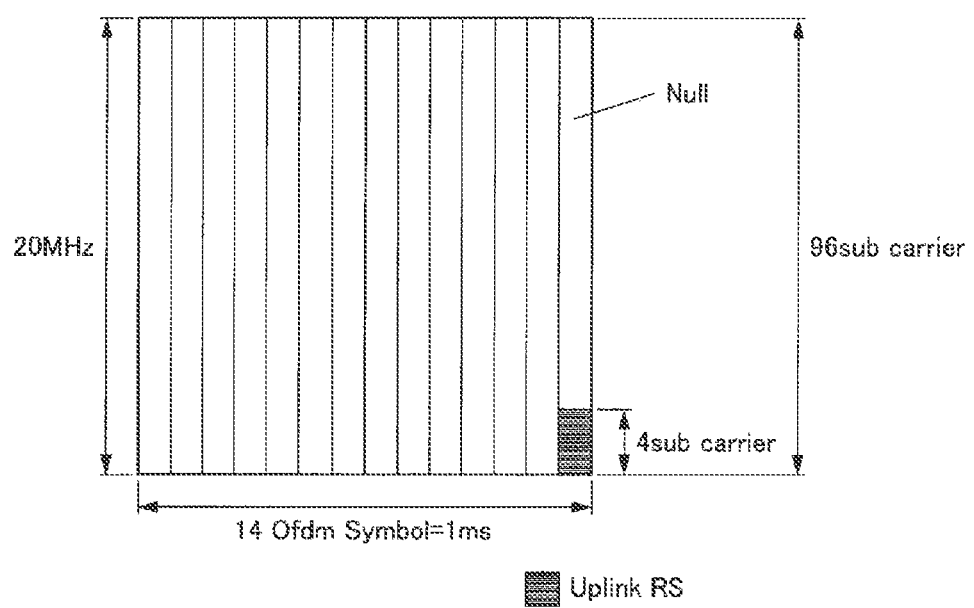
FIG. 10 is an explanatory diagram for describing a technical feature of the embodiment.

Meanwhile, the terminal apparatus 20 (e.g., the selection support unit 243) transmits an uplink RS in a partial frequency band of the uplink RS primary CC. Then, the terminal apparatus 20 (e.g., the selection support unit 243) concentrates transmission power of a level corresponding to the other frequency band on the partial frequency band. Accordingly, an uplink RS can be caused to reach the base station 10 in a high SNR state. An example of this state is shown in FIG. 10. In the example shown in FIG. 10, an uplink RS is transmitted on four subcarriers of an uplink RS primary CC having a bandwidth of 20 MHz in the $14^{th}$ OFDM. Transmission power of a level corresponding to remaining 92 subcarriers is concentrated on the four subcarriers. The region with hatching in the drawing is a region in which the uplink RS is transmitted, and the region without hatching is a region in which nothing is transmitted (i.e., a region in which NULL is transmitted). In a case in which subcarrier spacing is 15 kHz, one ODFM symbol can accommodate 24 uplink RSs. Thus, 24 terminal apparatuses 20 can transmit uplink RSs in one OFDM symbol at the same time.

Figure 11:
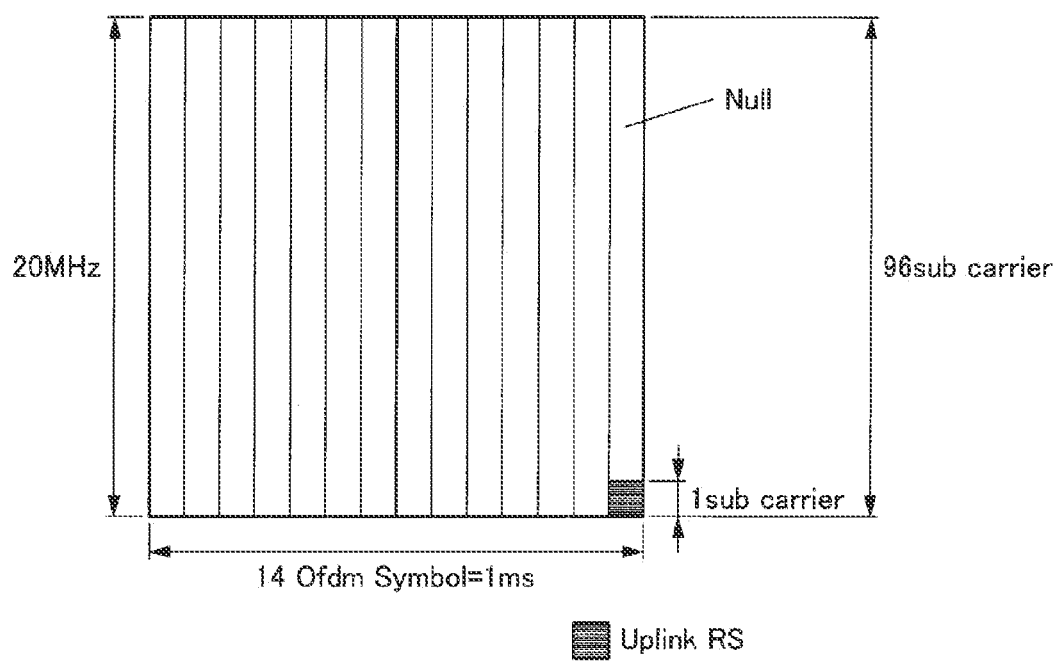
FIG. 11 is an explanatory diagram for describing a technical feature of the embodiment.

Furthermore, the terminal apparatus 20 (e.g., the selection support unit 243) may transmit an uplink RS on one subcarrier of an uplink RS primary CC. Then, the terminal apparatus 20 (e.g., the selection support unit 243) concentrates transmission power of a level corresponding to the other frequency band on the one subcarrier. Improvement of gain of 6 dB is realized in a case in which an uplink RS is transmitted on one subcarrier in comparison to, for example, a case in which an uplink RS is transmitted on four subcarriers. Accordingly, the uplink RS can be caused to reach the base station 10 in a high SNR state. An example of this state is shown in FIG. 11. In the example shown in FIG. 11, an uplink RS is transmitted on one subcarrier of an uplink RS primary CC having a bandwidth of 20 MHz in the 14$^{th}$ OFDM symbol. Transmission power of a level corresponding to remaining 95 subcarriers is concentrated on the one subcarrier.

Figure 12:
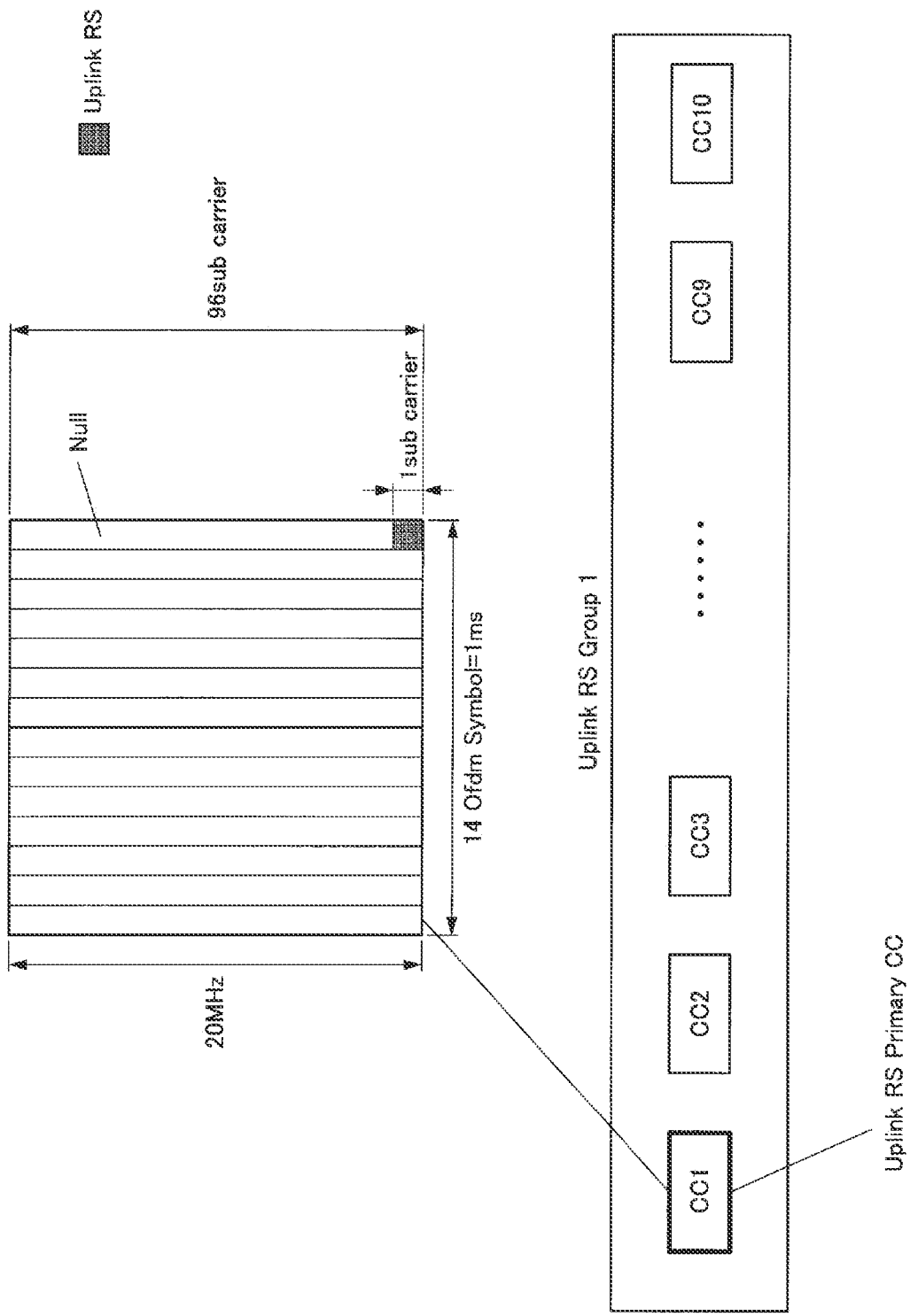
FIG. 12 is an explanatory diagram for describing a technical feature of the embodiment.

Furthermore, the terminal apparatus 20 (e.g., the selection support unit 243) may concentrate transmission power of a level corresponding to CCs other than an uplink RS primary CC included in an uplink RS group on the uplink RS primary CC. In this case, an uplink RS can be caused to reach the base station 10 in a higher SNR state. In a case in which an uplink RS group includes 10 CCs and has one uplink RS primary CC, 10 CCs can be concentrated on one CC, and thus improvement of gain of 10 dB is realized. An example of this state is shown in FIG. 12. In the example shown in FIG. 12, the uplink RS group includes 10 CCs, and an uplink RS is transmitted on one subcarrier of the uplink RS primary CC having a bandwidth of 20 MHz in the 14$^{th}$ OFDM symbol. Transmission power of a level corresponding to CC2 to CC10 and transmission power of a level corresponding to the remaining 95 subcarriers are concentrated on the one subcarrier.

Figure 13:
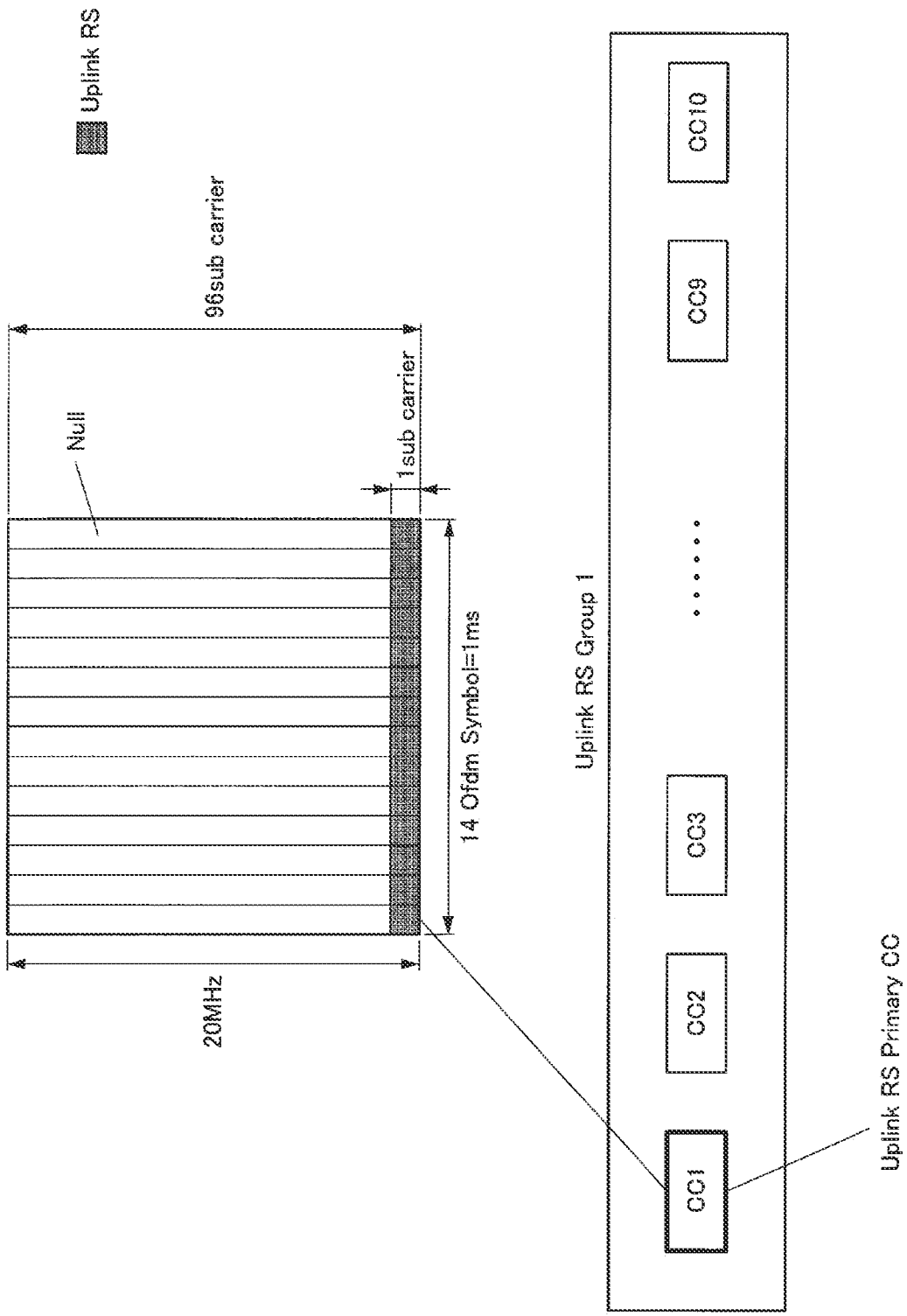
FIG. 13 is an explanatory diagram for describing a technical feature of the embodiment.

Furthermore, the terminal apparatus 20 (e.g., the selection support unit 243) may transmit an uplink RS using all of the 14 OFDM symbols. In this case, improvement of gain can be realized by the base station 10 laying 14 reception signals over the symbols. An example of this state is shown in FIG. 13. In the example shown in FIG. 13, an uplink RS is transmitted on one subcarrier of each uplink RS primary CC having a bandwidth of 20 MHz in the 14 OFDM symbols. In addition, an uplink RS group includes 10 CCs, and transmission power of a level corresponding to CC2 to CC10 and transmission power of a level corresponding to the remaining 95 subcarriers are concentrated on the one subcarrier.

6. Fourth Embodiment

<6.1. Technical Problem>

According to the third embodiment, an uplink RS can be caused to reach the base station 10 in high SNR state. Here, subcarrier spacing can be widened to about 120 kHz in a millimeter-wave band as shown in Table 1 above. This is because a burden of signal processing (e.g., fast Fourier transform (FFT) or the like) reduces at a high frequency at which a channel characteristic approach a flat characteristic that causes less fading (e.g., a 60 GHz band or the like). However, the case in which subcarrier spacing is 120 kHz has subcarrier spacing 8 times wider than a case in which subcarrier spacing is 15 kHz. For this reason, power density (dbm/Hz) reduces to ⅛, which may cause a reception characteristic of the base station 10 to deteriorate.

Thus, a mechanism which can maintain the reception characteristic of the base station 10 even in a case in which subcarrier spacing is wide is provided in the present embodiment.

<6.2. Technical Features>

The terminal apparatus 20 (e.g., the selection support unit 243) concentrates, on a further partial frequency band of one subcarrier, transmission power of the remaining frequency band. For example, even with subcarrier spacing of 120 kHz, the terminal apparatus 20 transmits an uplink RS by concentrating transmission power on subcarrier spacing of 15 kHz thereof. Accordingly, even in a case in which subcarrier spacing is wide, the base station 10 can maintain its reception characteristic. This will be described in detail below with reference to FIG. 14 and FIG. 15.

Figure 14:
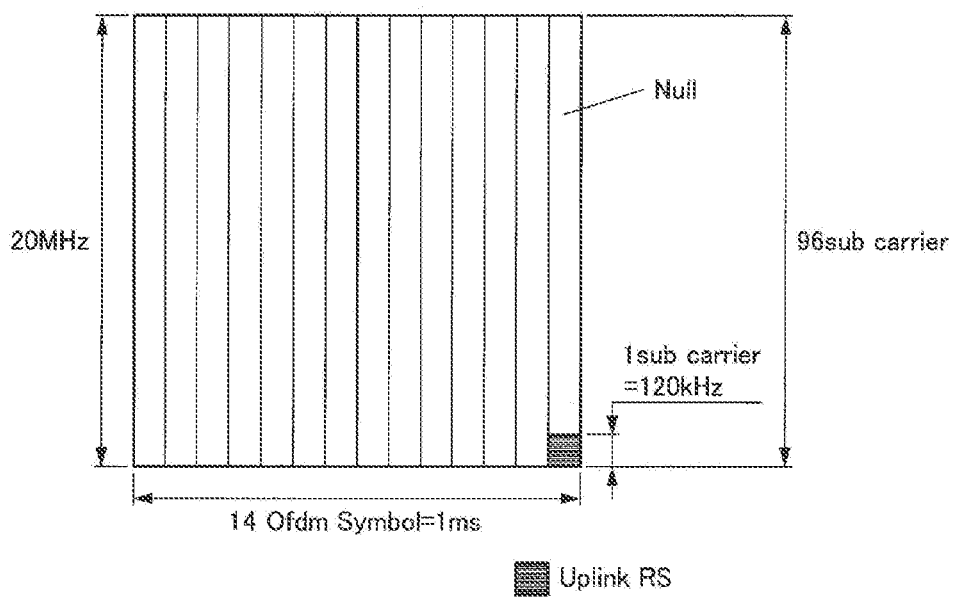
FIG. 14 is an explanatory diagram for describing a technical feature of a fourth embodiment.
Figure 15:
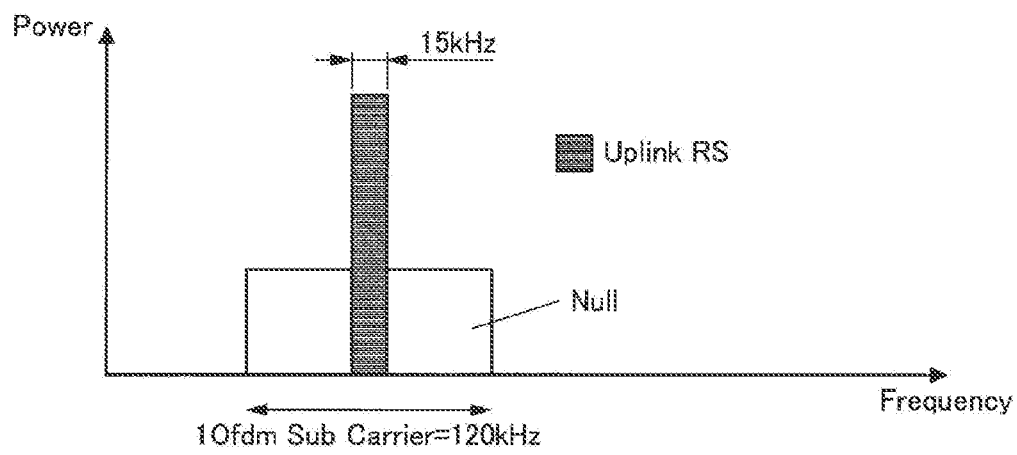
FIG. 15 is an explanatory diagram for describing a technical feature of the embodiment.

As shown in FIG. 14, an uplink RS is transmitted on one subcarrier having a bandwidth of 120 kHz of an uplink RS primary CC having a bandwidth of 20 MHz in the 14$^{th}$ OFDM symbol. Transmission power of a level corresponding to the remaining 95 subcarriers is concentrated on the one subcarrier. In addition, the uplink RS is transmitted in the 15 kHz band of the 120 kHz band on the one subcarrier as shown in FIG. 15. Transmission power of a level corresponding to the remaining 105 kHz band is further concentrated on the 15 kHz band.

Figure 16:
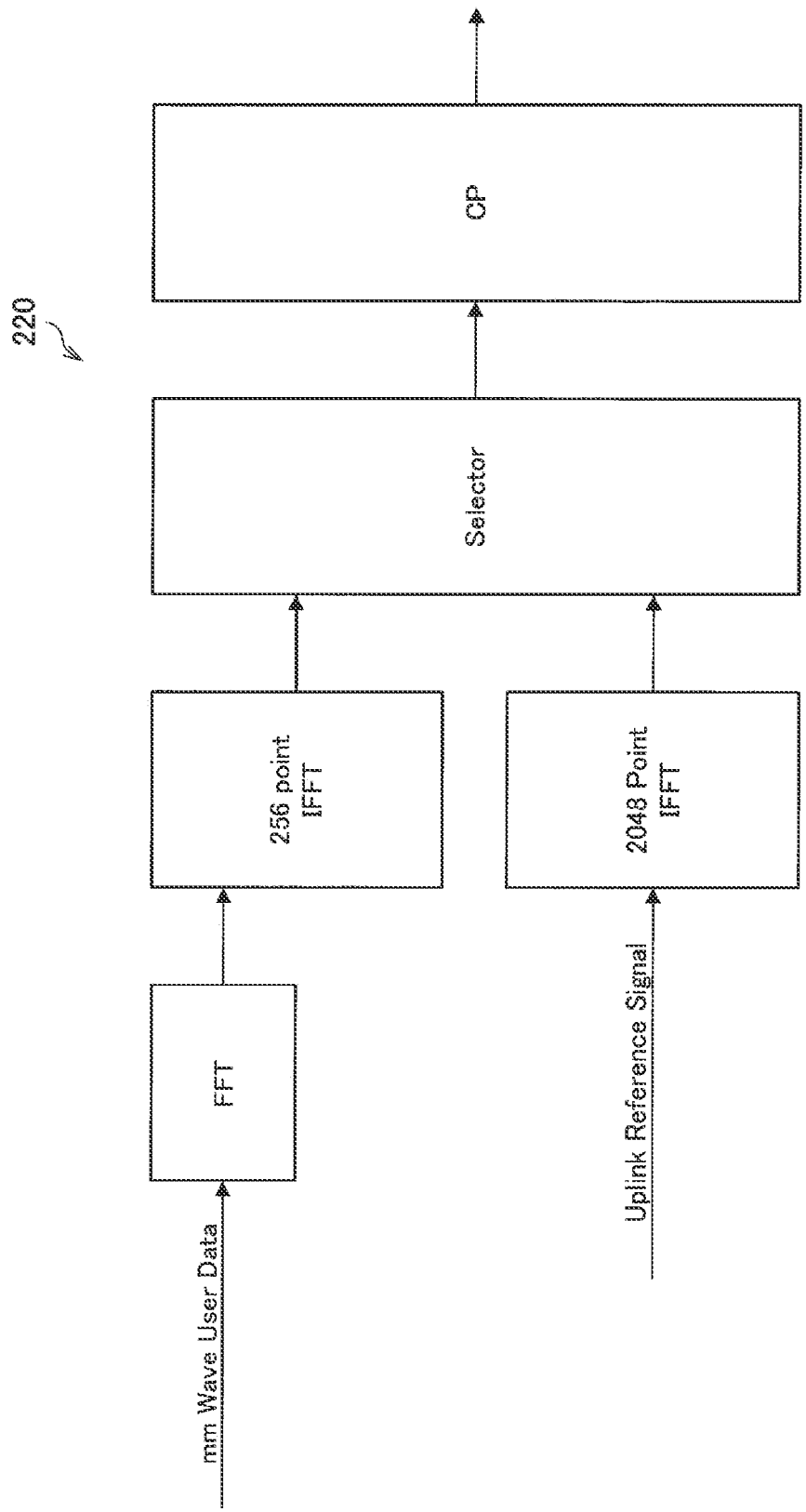
FIG. 16 is an explanatory diagram for describing a technical feature of the embodiment.

An example of a configuration of a signal processing unit (e.g., the wireless communication unit 220) for transmitting an uplink RS using spacing narrower than spacing of one subcarrier described above is shown in FIG. 16. 2048-point inverse FFT (IFFT) is performed to generate a subcarrier with spacing of 15 kHz. Meanwhile, 256-point IFFT is performed to generate a subcarrier with spacing of 120 kHz. Thus, the wireless communication unit 220 includes a module that performs 2048-point IFFT and a module that performs 256-point IFFT as shown in FIG. 16. The wireless communication unit 220 selects a signal output from any of the modules using a selector, and transmits the signal with a cyclic prefix attached thereto. When transmitting an uplink RS, the wireless communication unit 220 selects a signal output from the module that performs 2048-point IFFT. On the other hand, when transmitting user data, the wireless communication unit 220 selects a signal output from the module that performs 256-point IFFT via a module that performs FFT. Each of signals is separated in a time dividing manner, and no signal including an uplink RS and user data is transmitted from one terminal apparatus 20 at the same time.

7. Application Examples

The technology according to the present disclosure is applicable to various products. The base station 10 may also be implemented, for example, as any type of evolved Node B (eNB) such as macro eNBs and small eNBs. Small eNBs may be eNBs that cover smaller cells than the macrocells, such as pico eNBs, micro eNBs, or home (femto) eNBs. Instead, the base station 10 may be implemented as another type of base station such as Nodes B or base transceiver stations (BTSs). The base station 10 may include the main apparatus (which is also referred to as base station apparatus) that controls wireless communication and one or more remote radio heads (RRHs) that are disposed at different locations from that of the main apparatus. Also, various types of terminals described below may function as the base station 10 by temporarily or semi-permanently executing the functionality of the base station. Furthermore, at least some of structural elements of the base station 10 may be realized in a base station apparatus or a module for a base station apparatus.

Further, the terminal apparatus 20 may be implemented, for example, as a mobile terminal such as smartphones, tablet personal computers (PCs), notebook PCs, portable game terminals, portable/dongle mobile routers, and digital cameras, or an in-vehicle terminal such as car navigation apparatuses. Further, the terminal apparatus 20 may be implemented as a machine type communication (MTC) terminal for establishing a machine to machine (M2M) communication. Furthermore, at least some of structural elements of the terminal apparatus 20 may be implemented <7.1. Application Examples for Base Station>

First Application Example

Figure 17:
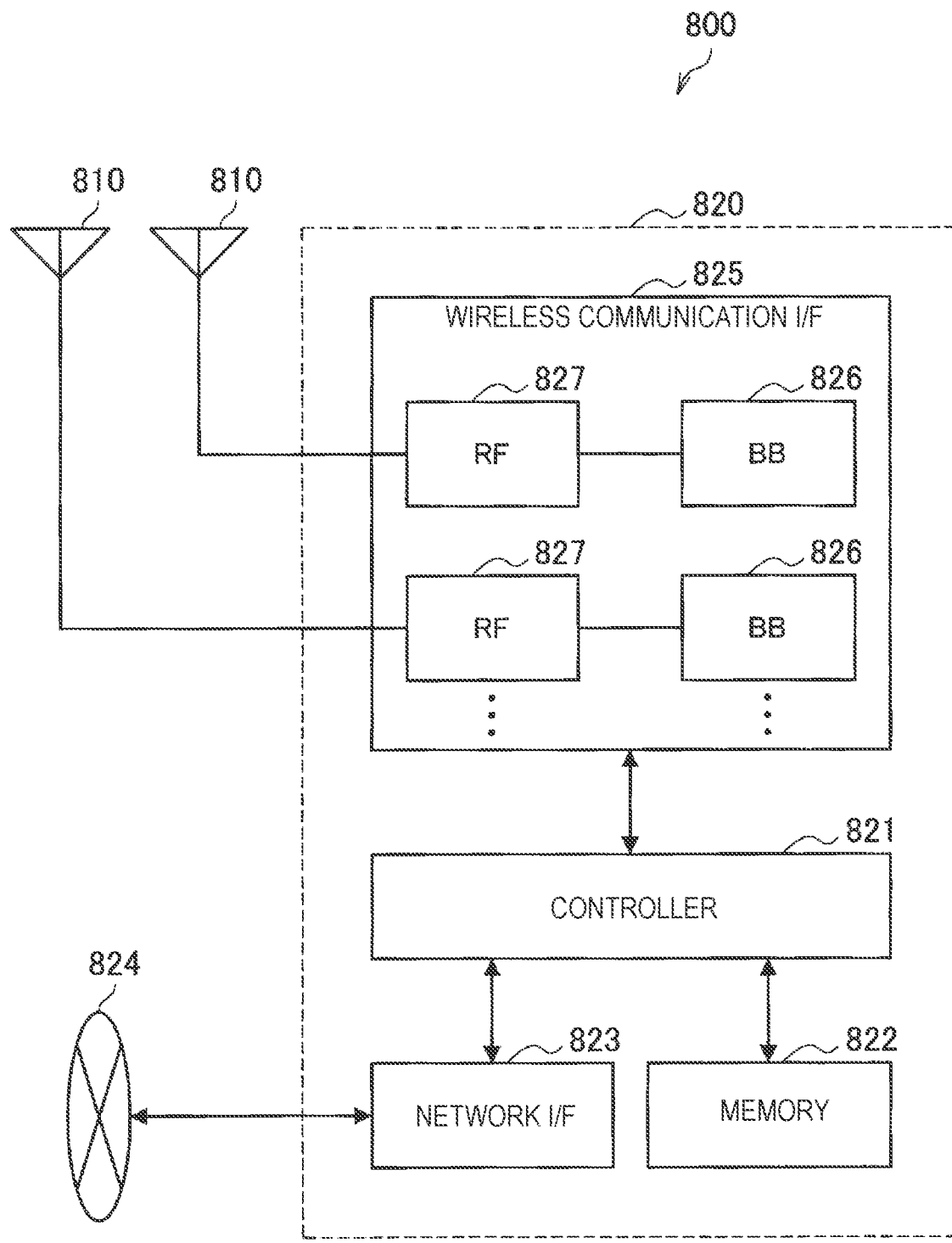
FIG. 17 is a block diagram illustrating a first example of a schematic configuration of an eNB.

FIG. 17 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable. Each of the antennas 810 includes a single or a plurality of antenna elements (e.g., a plurality of antenna elements constituting a MIMO antenna) and is used for the base station apparatus 820 to transmit and receive a wireless signal. The eNB 800 may include the plurality of the antennas 810 as illustrated in FIG. 17, and the plurality of antennas 810 may, for example, correspond to a plurality of frequency bands used by the eNB 800. It should be noted that while FIG. 17 illustrates an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. Further, the controller 821 may also have a logical function of performing control such as radio resource control, radio bearer control, mobility management, admission control, and scheduling. Further, the control may be performed in cooperation with a surrounding eNB or a core network node. The memory 822 includes a RAM and a ROM, and stores a program executed by the controller 821 and a variety of control data (such as, for example, terminal list, transmission power data, and scheduling data).

The network interface 823 is a communication interface for connecting the base station apparatus 820 to the core network 824. The controller 821 may communicate with a core network node or another eNB via the network interface 823. In this case, the eNB 800 may be connected to a core network node or another eNB through a logical interface (e.g., S1 interface or X2 interface). The network interface 823 may be a wired communication interface or a wireless communication interface for wireless backhaul. In the case where the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826, an RF circuit 827, and the like. The BB processor 826 may, for example, perform encoding/decoding, modulation/demodulation, multiplexing/demultiplexing, and the like, and performs a variety of signal processing on each layer (e.g., L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. Further, the module may be a card or blade to be inserted into a slot of the base station apparatus 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 17, and the plurality of BB processors 826 may, for example, correspond to a plurality of frequency bands used by the eNB 800. Further, the wireless communication interface 825 may also include a plurality of the RF circuits 827, as illustrated in FIG. 17, and the plurality of RF circuits 827 may, for example, correspond to a plurality of antenna elements. Note that FIG. 17 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 17, one or more structural elements included in the processing unit 150 (the setting unit 151 and/or the selection unit 153) described with reference to FIG. 3 may be implemented by the wireless communication interface 825. Alternatively, at least some of these structural elements may be implemented by the controller 821. As an example, a module which includes a part (e.g., the BB processor 826) or all of the wireless communication interface 825 and/or the controller 821 may be mounted in the eNB 800, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the eNB 800, and the wireless communication interface 825 (e.g., the BB processor 826) and/or the controller 821 may execute the program. As described above, the eNB 800, the base station apparatus 820, or the module may be provided as an apparatus which includes the one or more structural elements, and the program for causing the processor to function as the one or more structural elements may be provided. In addition, a readable recording medium in which the program is recorded may be provided.

In addition, in the eNB 800 illustrated in FIG. 17, the wireless communication unit 120 described with reference to FIG. 3 may be implemented by the wireless communication interface 825 (e.g., the RF circuit 827). Moreover, the antenna unit 110 may be implemented by the antenna 810. In addition, the network communication unit 130 may be implemented by the controller 821 and/or the network interface 823. Further, the storage unit 140 may be implemented by the memory 822.

Second Application Example

Figure 18:
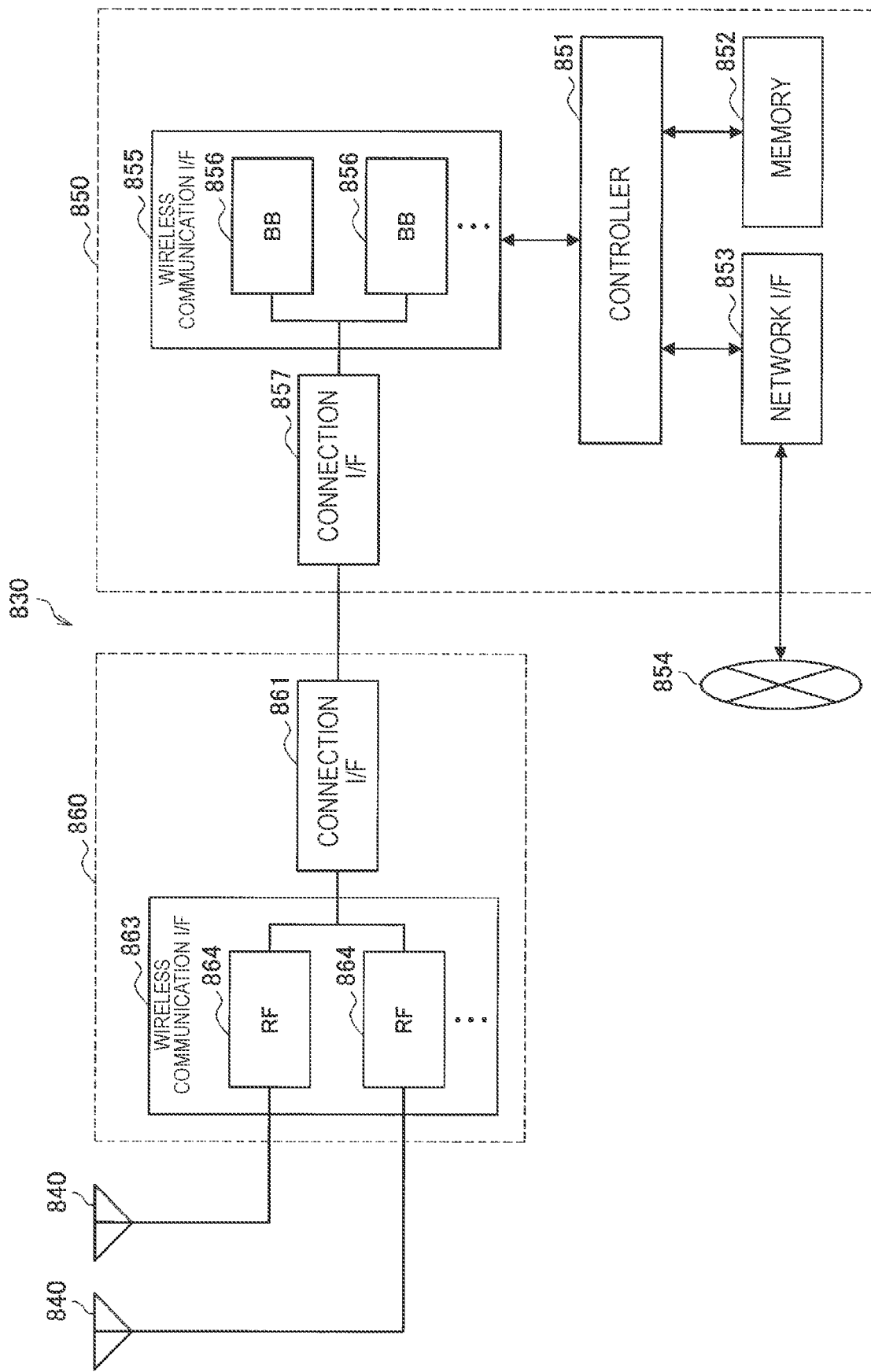
FIG. 18 is a block diagram illustrating a second example of the schematic configuration of the eNB.

FIG. 18 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be connected to each other via an RF cable. Further, the base station apparatus 850 and the RRH 860 may be connected to each other by a high speed line such as optical fiber cables. Each of the antennas 840 includes a single or a plurality of antenna elements (e.g., antenna elements constituting a MIMO antenna), and is used for the RRH 860 to transmit and receive a wireless signal. The eNB 830 may include a plurality of the antennas 840 as illustrated in FIG. 18, and the plurality of antennas 840 may, for example, correspond to a plurality of frequency bands used by the eNB 830. Note that FIG. 18 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 17.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856 or the like. The BB processor 856 is similar to the BB processor 826 described with reference to FIG. 17 except that the BB processor 856 is connected to an RF circuit 864 of the RRH 860 via the connection interface 857. The wireless communication interface 855 may include a plurality of the BB processors 856, as illustrated in FIG. 18, and the plurality of BB processors 856 may, for example, correspond to a plurality of frequency bands used by the eNB 830. Note that FIG. 18 illustrates an example in which the wireless communication interface 855 includes the plurality of BB processors 856, but the wireless communication interface 855 may include the single BB processor 856.

The connection interface 857 is an interface for connecting the base station apparatus 850 (wireless communication interface 855) to the RRH 860. The connection interface 857 may be a communication module for communication on the high speed line which connects the base station apparatus 850 (wireless communication interface 855) to the RRH 860.

Further, the RRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication on the high speed line.

The wireless communication interface 863 transmits and receives a wireless signal via the antenna 840. The wireless communication interface 863 may typically include the RF circuit 864 or the like. The RF circuit 864 may include a mixer, a filter, an amplifier and the like, and transmits and receives a wireless signal via the antenna 840. The wireless communication interface 863 may include a plurality of the RF circuits 864 as illustrated in FIG. 18, and the plurality of RF circuits 864 may, for example, correspond to a plurality of antenna elements. Note that FIG. 18 illustrates an example in which the wireless communication interface 863 includes the plurality of RF circuits 864, but the wireless communication interface 863 may include the single RF circuit 864.

In the eNB 830 illustrated in FIG. 18, one or more structural elements included in the processing unit 150 (the setting unit 151 and/or the selection unit 153) described with reference to FIG. 3 may be implemented by the wireless communication interface 855 and/or the wireless communication interface 863. Alternatively, at least some of these structural elements may be implemented by the controller 851. As an example, a module which includes a part (e.g., the BB processor 856) or all of the wireless communication interface 855 and/or the controller 851 may be mounted in the eNB 830, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the eNB 830, and the wireless communication interface 855 (e.g., the BB processor 856) and/or the controller 851 may execute the program. As described above, the eNB 830, the base station apparatus 850, or the module may be provided as an apparatus which includes the one or more structural elements, and the program for causing the processor to function as the one or more structural elements may be provided. In addition, a readable recording medium in which the program is recorded may be provided.

In addition, in the eNB 830 illustrated in FIG. 18, for example, the wireless communication unit 120 described with reference to FIG. 3 may be implemented by the wireless communication interface 863 (e.g., the RF circuit 864). Moreover, the antenna unit 110 may be implemented by the antenna 840. In addition, the network communication unit 130 may be implemented by the controller 851 and/or the network interface 853. Further, the storage unit 140 may be implemented by the memory 852.

<7.2. Application Examples for Terminal Apparatus>

First Application Example

Figure 19:
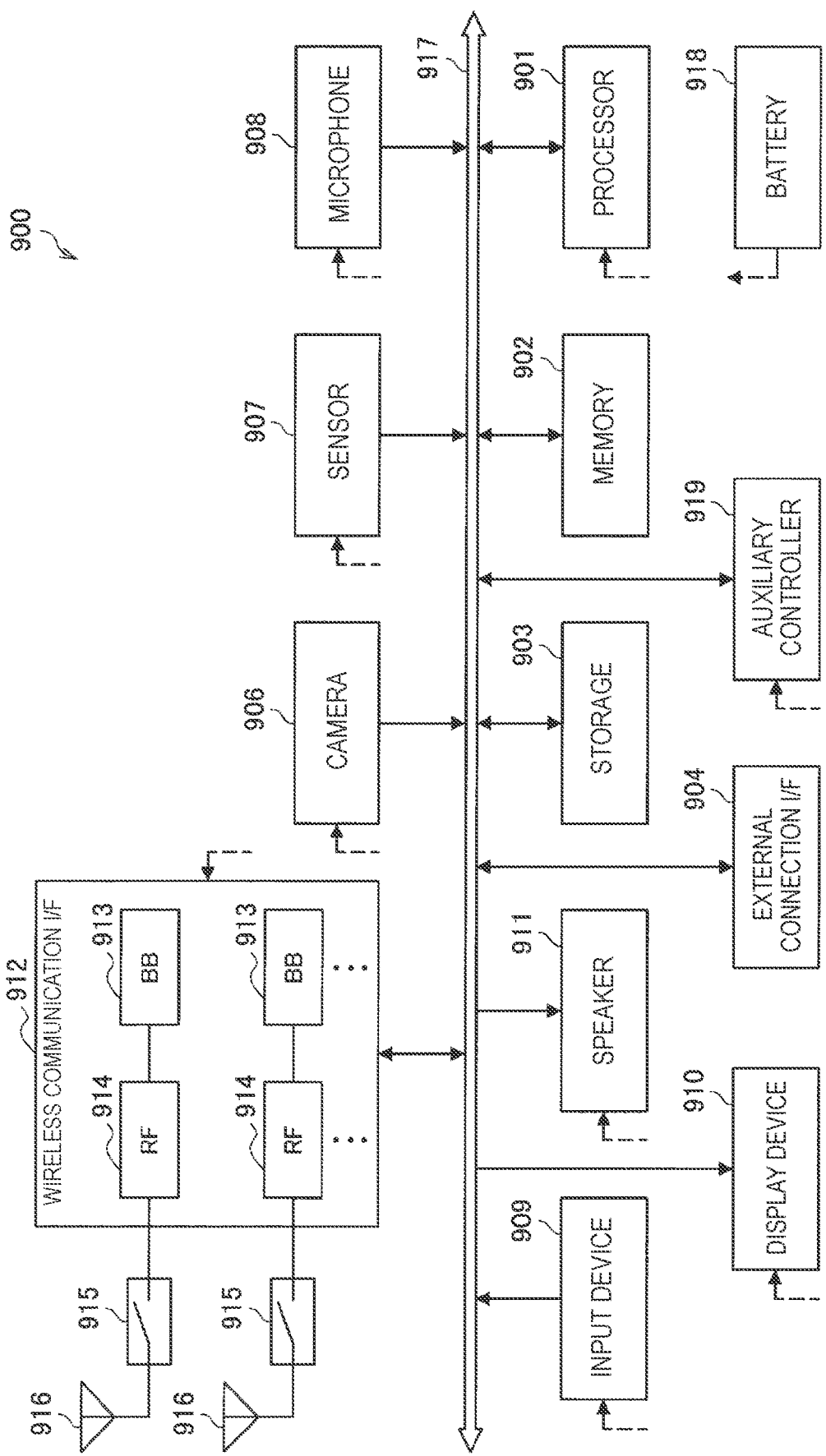
FIG. 19 is a block diagram illustrating an example of a schematic configuration of a smartphone.

FIG. 19 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes, for example, an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, an acceleration sensor and the like. The microphone 908 converts a sound that is input into the smartphone 900 to an audio signal. The input device 909 includes, for example, a touch sensor which detects that a screen of the display device 910 is touched, a key pad, a keyboard, a button, a switch or the like, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 19. Note that FIG. 19 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (e.g., circuits for different wireless communication systems) included in the wireless communication interface 912.

Each of the antennas 916 includes one or more antenna elements (e.g., a plurality of antenna elements constituting a MIMO antenna) and is used for transmission and reception of the wireless signal by the wireless communication interface 912. The smartphone 900 may include a plurality of antennas 916 as illustrated in FIG. 19. Note that FIG. 19 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies electric power to each block of the smartphone 900 illustrated in FIG. 19 via a feeder line that is partially illustrated in the figure as a dashed line. The auxiliary controller 919, for example, operates a minimally necessary function of the smartphone 900 in a sleep mode.

In the smartphone 900 illustrated in FIG. 19, one or more structural elements included in the processing unit 240 (the acquisition unit 241 and/or the selection support unit 243) described with reference to FIG. 4 may be implemented by the wireless communication interface 912. Alternatively, at least some of these structural elements may be implemented by the processor 901 or the auxiliary controller 919. As an example, a module which includes a part (e.g., the BB processor 913) or all of the wireless communication interface 912, the processor 901, and/or the auxiliary controller 919 may be mounted in the smartphone 900, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the smartphone 900, and the wireless communication interface 912 (e.g., the BB processor 913), the processor 901, and/or the auxiliary controller 919 may execute the program. As described above, the smartphone 900 or the module may be provided as an apparatus which includes the one or more structural elements, and the program for causing the processor to function as the one or more structural elements may be provided. In addition, a readable recording medium in which the program is recorded may be provided.

In addition, in the smartphone 900 illustrated in FIG. 19, for example, the wireless communication unit 220 described with reference to FIG. 4 may be implemented by the wireless communication interface 912 (e.g., the RF circuit 914). Moreover, the antenna unit 210 may be implemented by the antenna 916. Further, the storage unit 230 may be implemented by the memory 902.

Second Application Example

Figure 20:
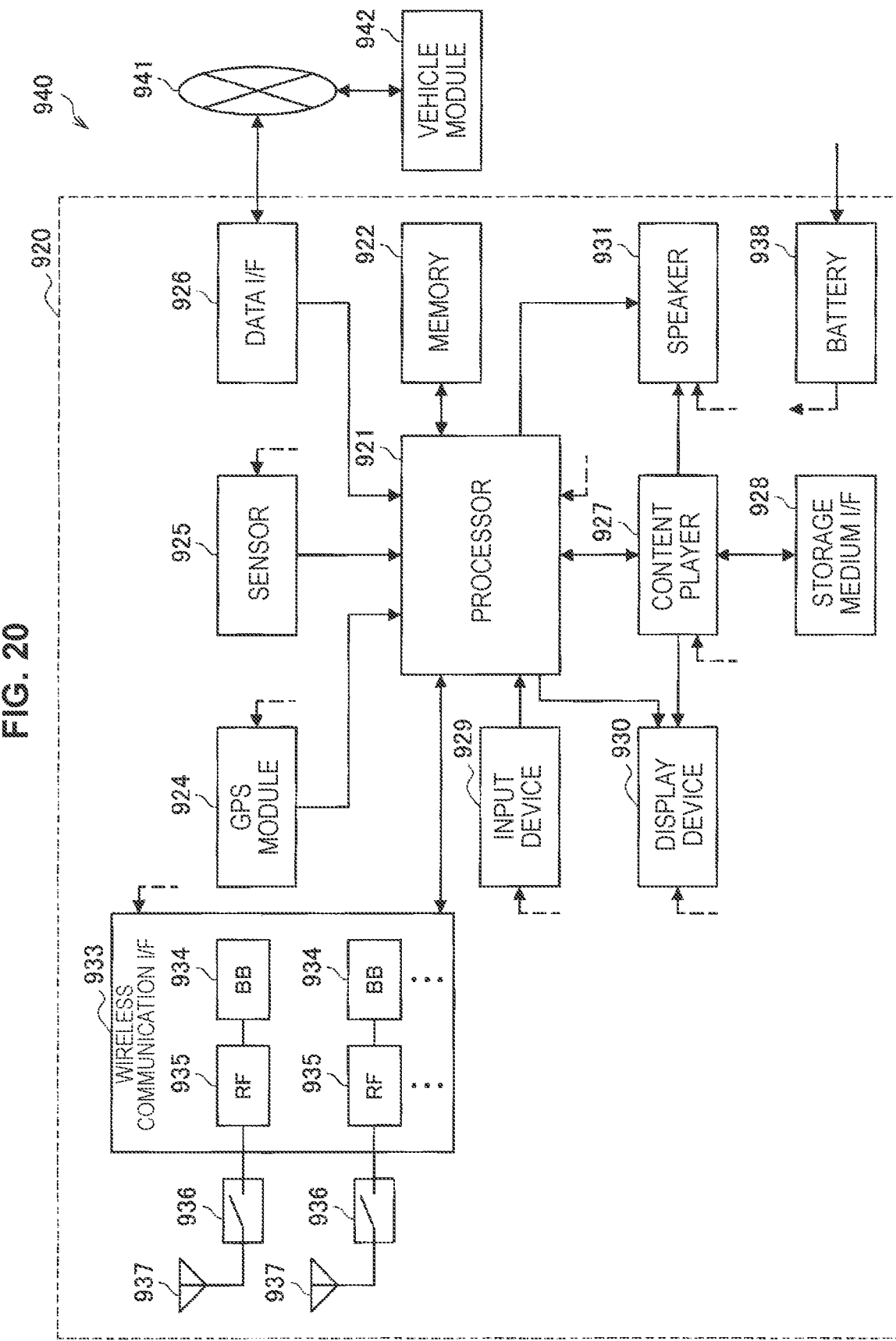
FIG. 20 is a block diagram illustrating an example of a schematic configuration of a car navigation apparatus.

FIG. 20 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g., latitude, longitude, and altitude) of the car navigation apparatus 920. The sensor 925 may include a sensor group including, for example, a gyro sensor, a geomagnetic sensor, a barometric sensor and the like. The data interface 926 is, for example, connected to an in-vehicle network 941 via a terminal that is not illustrated, and acquires data such as vehicle speed data generated on the vehicle side.

The content player 927 reproduces content stored in a storage medium (e.g., CD or DVD) inserted into the storage medium interface 928. The input device 929 includes, for example, a touch sensor which detects that a screen of the display device 930 is touched, a button, a switch or the like, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 20. Note that FIG. 20 illustrates an example in which the wireless communication interface 933 includes a plurality of BB processors 934 and a plurality of RF circuits 935, but the wireless communication interface 933 may include a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (e.g., circuits for different wireless communication systems) included in the wireless communication interface 933.

Each of the antennas 937 includes one or more antenna elements (e.g., a plurality of antenna elements constituting a MIMO antenna) and is used for transmission and reception of the wireless signal by the wireless communication interface 933. The car navigation apparatus 920 may include a plurality of antennas 937 as illustrated in FIG. 20. Note that FIG. 20 illustrates an example in which the car navigation apparatus 920 includes a plurality of antennas 937, but the car navigation apparatus 920 may include a single antenna 937.

Further, the car navigation apparatus 920 may include the antenna 937 for each wireless communication system. In this case, the antenna switch 936 may be omitted from a configuration of the car navigation apparatus 920.

The battery 938 supplies electric power to each block of the car navigation apparatus 920 illustrated in FIG. 20 via a feeder line that is partially illustrated in the figure as a dashed line. Further, the battery 938 accumulates the electric power supplied from the vehicle.

In the car navigation apparatus 920 illustrated in FIG. 20, one or more structural elements included in the processing unit 240 (the acquisition unit 241 and/or the selection support unit 243) described with reference to FIG. 4 may be implemented by the wireless communication interface 933. Alternatively, at least some of these structural elements may be implemented by the processor 921. As an example, a module which includes a part (e.g., the BB processor 934) or all of the wireless communication interface 933 and/or the processor 921 may be mounted in the car navigation apparatus 920, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the car navigation apparatus 920, and the wireless communication interface 933 (e.g., the BB processor 934) and/or the processor 921 may execute the program. As described above, the car navigation apparatus 920 or the module may be provided as an apparatus which includes the one or more structural elements, and the program for causing the processor to function as the one or more structural elements may be provided. In addition, a readable recording medium in which the program is recorded may be provided.

In addition, in the car navigation apparatus 920 illustrated in FIG. 20, for example, the wireless communication unit 220 described with reference to FIG. 4 may be implemented by the wireless communication interface 933 (e.g., the RF circuit 935). Moreover, the antenna unit 210 may be implemented by the antenna 937. Further, the storage unit 230 may be implemented by the memory 922.

The technology of the present disclosure may also be realized as an in-vehicle system (or a vehicle) 940 including one or more blocks of the car navigation apparatus 920, the in-vehicle network 941, and a vehicle module 942. In other words, the in-vehicle system (or a vehicle) 940 may be provided as an apparatus which includes the acquisition unit 241 and/or the selection support unit 243. The vehicle module 942 generates vehicle data such as vehicle speed, engine speed, and trouble information, and outputs the generated data to the in-vehicle network 941.

8. Conclusion

Embodiments of the present disclosure have been described above in detail with reference to FIG. 1 to FIG. 20. As described above, the terminal apparatus 20 acquires setting information from the base station 10, and transmits an uplink RS to be used for selecting a beam to be used by the base station 10 in downlink transmission using at least one uplink RS primary CC of an uplink RS group including a plurality of CCs indicated by the setting information. The base station 10 can select a transmission beam appropriate for the terminal apparatus 20 on the basis of a measurement result of the uplink RS. In addition, since the uplink RS is transmitted only on the uplink RS primary CC of the uplink RS group, power consumption of the terminal apparatus 20 can be reduced in comparison to a case in which an uplink RS is transmitted on all of a large number of CCs in a millimeter-wave band. With this configuration, efficient beam selection is realized, and thus the base station 10 can realize efficient carrier aggregation in the millimeter-wave band, efficiency in accommodating traffic on a cellular network can be improved.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the embodiments of the present disclosure can be appropriately combined.

Note that it is not necessary for the processing described in this specification with reference to the flowchart and the sequence diagram to be executed in the order shown in the flowchart and the sequence diagram. Some processing steps may be performed in parallel. Further, some of additional steps can be adopted, or some processing steps can be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An apparatus including:

an acquisition unit configured to acquire setting information from a base station; and a selection support unit configured to transmit an uplink reference signal to be used for selecting a beam to be used by the base station in downlink transmission using at least one first unit frequency band of a group including a plurality of unit frequency bands indicated by the setting information.

(2)

The apparatus according to (1), in which the selection support unit transmits, to the base station, information regarding measurement of a downlink reference signal transmitted by the base station using one or more beams selected on a basis of the uplink reference signal.

(3)

The apparatus according to (2), in which the information regarding measurement is transmitted using the first unit frequency band.

(4)

The apparatus according to any one of (1) to (3), in which the selection support unit transmits capability information indicating the unit frequency bands available for the apparatus to the base station.

(5)

The apparatus according to (4), in which the capability information includes information indicating an available group and an available unit frequency band of the group.

(6)

The apparatus according to any one of (1) to (5), in which the selection support unit transmits the uplink reference signal using a partial frequency band of the first unit frequency band and concentrates transmission power of a level corresponding to another frequency band on the partial frequency band.

(7)

The apparatus according to (6), in which the selection support unit concentrates transmission power of a level corresponding to a second unit frequency band other than the first unit frequency band included in the group on the partial frequency band.

(8)

The apparatus according to (6) or (7), in which the partial frequency band is one subcarrier.

(9)

The apparatus according to (8), in which the selection support unit concentrates, on a further partial frequency band of the one subcarrier, transmission power of the remaining frequency band.

(10)

The apparatus according to any one of (1) to (9), in which the group includes some unit frequency bands of the plurality of unit frequency bands available for a base station.

(11)

The apparatus according to any one of (1) to (10), in which the unit frequency bands are component carriers.

(12)

The apparatus according to any one of (1) to (11), in which the unit frequency bands have a frequency of 6 GHz or higher.

(13)

An apparatus including:

a setting unit configured to transmit setting information indicating at least one first unit frequency band of a group including a plurality of unit frequency bands to a terminal apparatus; and a selection unit configured to select a beam to be used in downlink transmission on a basis of a measurement result of an uplink reference signal transmitted by the terminal apparatus using the first unit frequency band.

(14)

The apparatus according to (13), in which the selection unit transmits a downlink reference signal using a selected beam.

(15)

The apparatus according to (14), in which the selection unit transmits the downlink reference signal using all of the plurality of unit frequency bands included in the group.

(16)

The apparatus according to (15), in which the selection unit selects a beam to be used in downlink transmission on a basis of information regarding measurement of the downlink reference signal by the terminal apparatus.

(17)

The apparatus according to any one of (13) to (16), in which the setting unit variably sets the first unit frequency band for each terminal apparatus.

(18)

The apparatus according to (17), in which the setting unit selects the first unit frequency band on a basis of capability information indicating the unit frequency bands available for the terminal apparatus.

(19)

A method including:

acquiring setting information from a base station; and transmitting, by a processor, an uplink reference signal to be used for selecting a beam to be used by the base station in downlink transmission using at least one first unit frequency band of a group including a plurality of unit frequency bands indicated by the setting information.

(20)

A method including:

transmitting setting information indicating at least one first unit frequency band of a group including a plurality of unit frequency bands to a terminal apparatus; and selecting, by a processor, a beam to be used in downlink transmission on a basis of a measurement result of an uplink reference signal transmitted by the terminal apparatus using the first unit frequency band.

REFERENCE SIGNS LIST

1 system
10 base station 11 small cell
15 core network
16 packet data network
20 terminal apparatus
30 communication control apparatus
31 macro cell
110 antenna unit
120 wireless communication unit
130 network communication unit
140 storage unit
150 processing unit
151 setting unit
153 selection unit
210 antenna unit
220 wireless communication unit
230 storage unit
240 processing unit
241 acquisition unit
243 selection support unit

The invention claimed is:

1. An apparatus, comprising:
    circuitry configured to:
        acquire setting information, wherein the setting information corresponds to:
            group information of a group comprising a plurality of unit frequency bands, and
            first information indicating at least one first unit frequency band of the group, wherein the at least one first unit frequency band is decided by a base station; and
        transmit an uplink reference signal to the base station, wherein
        the uplink reference signal is used for selection of a beam utilized by the base station in downlink transmission, and
        the uplink reference signal is transmitted based on the at least one first unit frequency band of the group.

2. The apparatus according to claim 1, wherein
    the circuitry is further configured to transmit measurement information of a downlink reference signal to the base station,
    the downlink reference signal is transmitted by the base station based on the selection of the beam, and
    the selection of the beam is based on the uplink reference signal.

3. The apparatus according to claim 2, wherein the circuitry is further configured to transmit the measurement information via the at least one first unit frequency band.

4. The apparatus according to claim 1, wherein
    the circuitry is further configured to transmit capability information to the base station, and
    the capability information indicates the plurality of unit frequency bands available for the apparatus.

5. The apparatus according to claim 4, wherein the capability information indicates an available group and an available unit frequency band of the available group.

6. The apparatus according to claim 1, wherein the circuitry is further configured to:
    transmit the uplink reference signal via a first partial frequency band of the at least one first unit frequency band; and
    concentrate a first transmission power of a level corresponding to a second unit frequency band on the first partial frequency band.

7. The apparatus according to claim 6, wherein the second unit frequency band is different from the at least one first unit frequency band of the group.

8. The apparatus according to claim 6, wherein the first partial frequency band is one subcarrier.

9. The apparatus according to claim 8, wherein the circuitry is further configured to concentrate a second transmission power of remaining frequency band of the group on a second partial frequency band of the one subcarrier.

10. The apparatus according to claim 1, wherein the group includes a set of unit frequency bands of the plurality of unit frequency bands available for the base station.

11. The apparatus according to claim 1, wherein the plurality of unit frequency bands is a set of component carriers.

12. The apparatus according to claim 1, wherein the plurality of unit frequency bands has a frequency of 6 GHz or higher.

13. An apparatus, comprising:
    circuitry configured to:
        decide at least one first unit frequency band of a group comprising a plurality of unit frequency bands;
        transmit setting information to a terminal apparatus, wherein the setting information corresponds to:
            group information of the group, and
            first information indicating the decided at least one first unit frequency band; and
        select a beam for use in downlink transmission, wherein
        the beam is selected based on a measurement result of an uplink reference signal transmitted by the terminal apparatus, and
        the uplink reference signal is transmitted based on the at least one first unit frequency band.

14. The apparatus according to claim 13, wherein the circuitry is further configured to transmit a downlink reference signal based on the selected beam.

15. The apparatus according to claim 14, wherein the circuitry is further configured to transmit the downlink reference signal based on all of the plurality of unit frequency bands in the group.

16. The apparatus according to claim 15, wherein the circuitry is further configured to select the beam based on measurement information of the downlink reference signal transmitted by the terminal apparatus.

17. The apparatus according to claim 13, wherein the circuitry is further configured to set the at least one first unit frequency band for the terminal apparatus.

18. The apparatus according to claim 17, wherein the circuitry is further configured to select the at least one first unit frequency band based on capability information indicating the plurality of unit frequency bands available for the terminal apparatus.

19. A method, comprising:
    acquiring, by a processor, setting information from a base station, wherein the setting information corresponds to:
        group information of a group comprising a plurality of unit frequency bands, and
        first information indicating at least one unit frequency band of the group, wherein the at least one unit frequency band is decided by the base station; and
    transmitting, by the processor, an uplink reference signal to the base station, wherein
    the uplink reference signal is used for selection of a beam utilized by the base station in downlink transmission, and
    the uplink reference signal is transmitted based on the at least one unit frequency band of the group.

20. A method, comprising:
deciding, by a processor, at least one unit frequency band of a group comprising a plurality of unit frequency bands;
transmitting, by the processor, setting information to a terminal apparatus, wherein the setting information corresponds to:
group information of the group, and
first information indicating the decided at least one unit frequency band; and
selecting, by the processor, a beam for use in downlink transmission, wherein
the beam is selected based on a measurement result of an uplink reference signal transmitted by the terminal apparatus, and
the uplink reference signal is transmitted based on the at least one unit frequency band.

* * * * *